US011807174B2

United States Patent
Hakuta

(10) Patent No.: US 11,807,174 B2
(45) Date of Patent: *Nov. 7, 2023

(54) PARTITION MEMBER, VEHICLE, AND ELECTRONIC DEVICE

(71) Applicant: FUJIFILM Corporation, Tokyo (JP)

(72) Inventor: Shinya Hakuta, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 436 days.

This patent is subject to a terminal disclaimer.

(21) Appl. No.: 17/176,709

(22) Filed: Feb. 16, 2021

(65) Prior Publication Data

US 2021/0162936 A1 Jun. 3, 2021

Related U.S. Application Data

(63) Continuation of application No. PCT/JP2019/027693, filed on Jul. 12, 2019.

(30) Foreign Application Priority Data

Aug. 17, 2018 (JP) .................................. 2018-153445

(51) Int. Cl.
*B60R 13/08* (2006.01)
*G10K 11/172* (2006.01)

(52) U.S. Cl.
CPC ........ *B60R 13/0823* (2013.01); *G10K 11/172* (2013.01)

(58) Field of Classification Search
CPC .................................................. B60R 13/0823
See application file for complete search history.

(56) References Cited

U.S. PATENT DOCUMENTS 5,241,512 A * 8/1993 Argy .................... G10K 11/172
181/207
8,869,933 B1 * 10/2014 McKnight ............. E04B 1/8404
181/207

(Continued)

FOREIGN PATENT DOCUMENTS

JP 10-205351 A 8/1998
JP 2001-199287 A 7/2001

(Continued)

OTHER PUBLICATIONS

International Preliminary Report on Patentability and Written Opinion of the International Searching Authority for International Application No. PCT/JP2019/027693, dated Mar. 4, 2021, with an English translation.

(Continued)

*Primary Examiner* — Forrest M Phillips
(74) *Attorney, Agent, or Firm* — Birch, Stewart, Kolasch & Birch, LLP

(57) ABSTRACT

Provided are a partition member including a soundproof structure capable of efficiently insulating noise with a lightweight configuration, and an electronic device and a vehicle using the partition member.
In the partition member including the soundproof structure, the soundproof structure includes a support body having an opening, and a membrane-like member that is fixed to an opening surface of the support body in which the opening is formed and that vibrates as noise is incident, and a rear surface plate fixed to the support body on a side opposite to the membrane-like member, and the soundproof structure absorbs a sound by a resonance structure formed by a rear surface space surrounded by the rear surface plate, the membrane-like member, and the support body and the membrane-like member, and insulates a sound having a frequency higher than a relative maximum resonance fre- (Continued)

quency at which a sound absorption coefficient becomes a relative maximum among resonance frequencies of the resonance structure. The relative maximum resonance frequency is set to be lower than a sound insulation target frequency set for noise. Furthermore, in a case where the sound insulation target frequency is indicated as fn and the relative maximum resonance frequency is indicated as fr, fn/fr is 1.05 to 1.50.

17 Claims, 14 Drawing Sheets

(56) References Cited

U.S. PATENT DOCUMENTS

| | | | |
|---|---|---|---|
| 10,373,599 B2* | 8/2019 | Hakuta | G10K 11/161 |
| 10,704,255 B2* | 7/2020 | Hakuta | E04B 1/8409 |
| 11,551,656 B2* | 1/2023 | Hakuta | G10K 11/172 |
| 2013/0087407 A1* | 4/2013 | McKnight | G10K 11/172 181/287 |
| 2015/0047923 A1* | 2/2015 | Chang | H03H 9/25 181/286 |

FOREIGN PATENT DOCUMENTS

| | | |
|---|---|---|
| JP | 2009-139555 A | 6/2009 |
| JP | 2009-139556 A | 6/2009 |
| JP | 2016-170194 A | 9/2016 |

OTHER PUBLICATIONS

International Search Report for International Application No. PCT/JP2019/027693, dated Aug. 13, 2019, with an English translation.

* cited by examiner

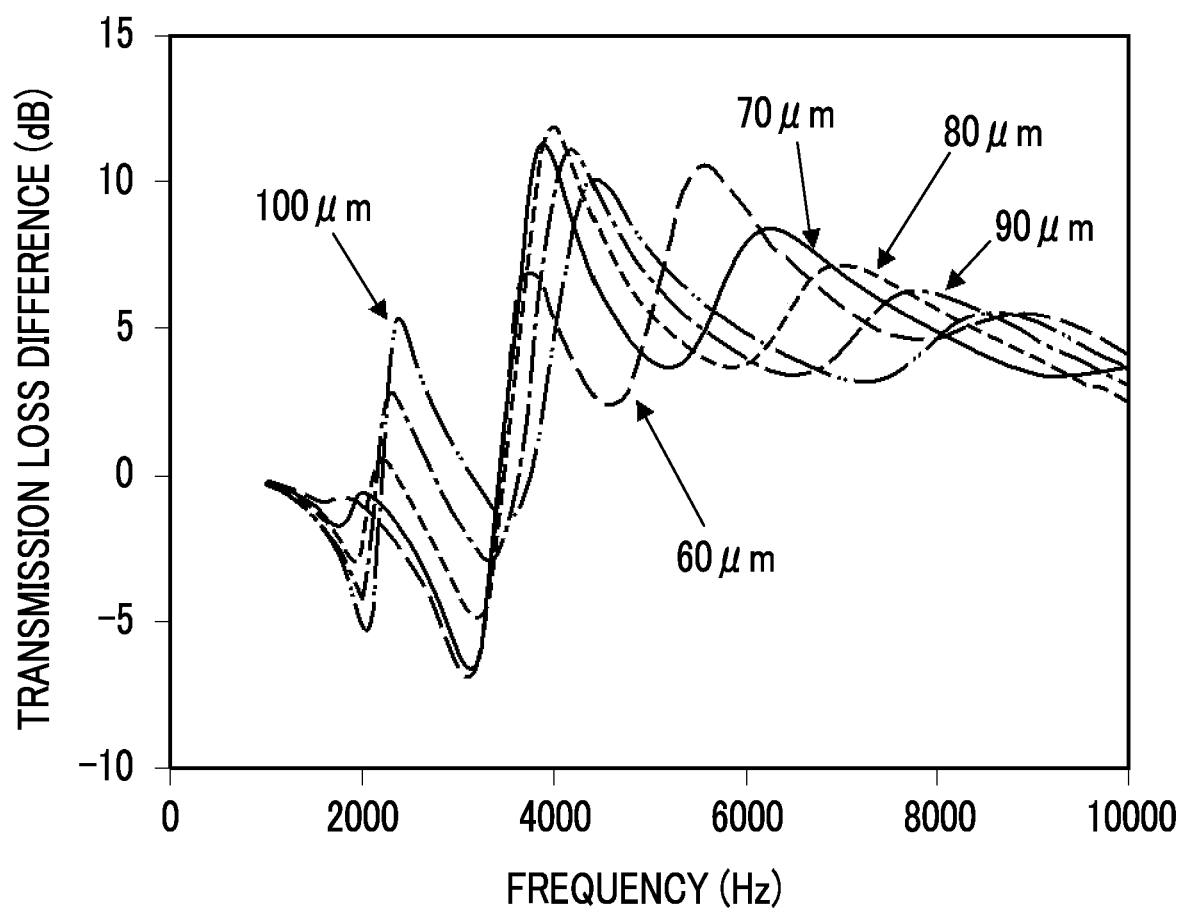

PARTITION MEMBER, VEHICLE, AND ELECTRONIC DEVICE

CROSS-REFERENCE TO RELATED APPLICATIONS

This application is a Continuation of PCT International Application No. PCT/JP2019/027693 filed on Jul. 12, 2019, which claims priority under 35 U.S.C. § 119(a) to Japanese Patent Application No. 2018-153445 filed on Aug. 17, 2018. The above application is hereby expressly incorporated by reference, in its entirety, into the present application.

BACKGROUND OF THE INVENTION

1. Field of the Invention

The present invention relates to a partition member including a soundproof structure, and a vehicle and an electronic device provided with the partition member, and more particularly to a partition member including a soundproof structure that absorbs a sound by a resonance structure formed by a membrane-like member and a rear surface space, and a vehicle and an electronic device provided with the partition member.

2. Description of the Related Art

In building materials, vehicles, and the like, a sound that shakes and comes through (is transmitted by) a wall becomes a problem as noise in many cases. In particular, noise of a single frequency sound is uncomfortable (harsh) to humans, and it is necessary to take measures. However, in a silencing method in the related art using a porous sound absorbing body, there are cases where the single frequency sound is not sufficiently reduced.

Another silencing method is to use a soundproof structure that adopts a resonance structure formed of a vibrating body. The resonance structure includes the vibrating body, a support body that supports the vibrating body in a vibrating manner, and a rear surface plate fixed to the support body on the side opposite to the vibrating body. In the above resonance structure, a sound absorbing mechanism is formed in which the vibrating body is a mass spring component and a rear surface space surrounded by the vibrating body, the support body, and the rear surface plate is an air spring component. The soundproof structure adopting this resonance structure is provided, for example, on a partition member such as a wall, and is used with a resonance frequency that matches the frequency of noise emitted from a sound source provided on one side of two spaces partitioned by the partition member. Accordingly, it is possible to selectively absorb a sound having a specific frequency (that is, the same frequency as the resonance frequency).

An example of the resonance structure described above is a resonance structure described in JP2016-170194A. JP2016-170194A discloses a sound absorbing body including a diaphragm that receives a sound wave from an external sound source and resonates, and a frame body that supports an end portion of the diaphragm and surrounds an air layer. According to the resonance structure described in JP2016-170194A, it is possible to selectively absorb a sound having a frequency that matches a resonance frequency.

In addition, a resonance structure that achieves soundproofing at a frequency different from a resonance frequency is already known, and examples thereof include a resonance structure disclosed in JP1998-205351A (JP-H10-205351A).

JP1998-205351A (JP-H10-205351A) discloses a resonator having a diaphragm connected to a noise generating vibrating body (corresponding to a sound source of noise) via a connecting mechanism or the like. According to this resonator, in a case where the noise generating vibrating body vibrates and generates noise, the diaphragm vibrates and the volume inside the resonator changes. Here, at a frequency higher than the resonance frequency of the resonator, the sound radiated from the resonator and the noise emitted from the noise generating vibrating body are in antiphase, so that these sounds cancel each other out and silenced.

SUMMARY OF THE INVENTION

However, regarding the performance of a soundproof structure, there are cases where the soundproofing performance by sound insulation is required rather than the soundproofing performance by sound absorption. On the other hand, the resonance structure described in JP2016-170194A mainly reduces noise by sound absorption, and the sound insulation effect thereof is unknown.

In addition, in the resonance structure in which the membrane-like member is supported by the support body and the rear surface plate is fixed to the support body on the side opposite to the membrane-like member, as described above, the rear surface space surrounded by the membrane-like member, the support body, and the rear surface plate contributes to resonance. On the other hand, according to the examination by the present inventors, it became clear that in a case where the resonance frequency is matched to the frequency of noise in the above resonance structure, a sound is more likely to pass through the rear surface plate, and the sound insulation properties thereof are lower than that of a simple plate member.

In order to improve the sound insulation properties in the above resonance structure, for example, it is considered that the resonance frequency of the resonance structure is set in an appropriate range according to the frequency of noise. In a resonance structure body disclosed in JP1998-205351A (JP-H10-205351A) described above, the noise emitted from the noise generating vibrating body is canceled at a frequency higher than the resonance frequency of the resonator. However, in the resonance structure body of JP1998-205351A (JP-H10-205351A), it is necessary to provide a rigid body (connecting mechanism or the like) for connecting the diaphragm to the noise generating vibrating body, but regarding noise such as road noise or wind noise of a car, it is difficult to achieve connection to a source thereof. In the resonance structure body disclosed in JP1998-205351A (JP-H10-205351A), in a case where the resonance frequency is largely deviated from the frequency of the sound to be silenced, the silencing effect tends to be reduced. Therefore, the resonance frequency also needs to be set to a high frequency. However, in a case where high frequency resonance is to be generated, the resonance efficiency may decrease depending on the vibration mode of the vibrating body (for example, in fundamental vibration).

Further, as a method of improving the sound insulation properties of the soundproof structure, it is common to increase the weight of the entire structure. However, as the soundproof structure becomes heavier, it is difficult to handle the soundproof structure or a partition member to which the soundproof structure is attached, such as a wall. Therefore, it is required to improve the sound insulation properties of a resonance structure with a lightweight configuration.

Furthermore, in sound insulation according to the mass law by weight, the effect of sound insulation is obtained as the frequency becomes higher over the entire frequency range. However, in a case where a sound having a specific frequency or a sound of a narrow band of frequencies is noise, in a case where the noise is to be insulated according to the mass law, the sound pressure is reduced as a whole while a state where the noise is significantly higher than sounds of surrounding frequencies remains unchanged from the original state. For this reason, the state where the specific frequency that is heard is stronger than the surrounding frequencies remains unchanged.

The present invention has been made in view of the above circumstances, and an object of the present invention is to solve the following purposes.

That is, the present invention solves the above-mentioned problems of the related art, and an object thereof is to provide a partition member provided with a soundproof structure capable of efficiently insulating noise with a lightweight configuration, and an electronic device and a vehicle using the partition member.

In order to achieve the above object, a partition member of the present invention is a partition member that includes a soundproof structure that reduces noise emitted from a sound source on one side of two spaces, and partitions the two spaces, in which the soundproof structure includes a support body having an opening, a membrane-like member that is fixed to an opening surface of the support body in which the opening is formed and that vibrates in a case where noise is incident, a rear surface plate fixed to the support body on a side opposite to the membrane-like member, the soundproof structure absorbs a sound by a resonance structure formed by a rear surface space surrounded by the rear surface plate, the membrane-like member, and the support body and the membrane-like member, and insulates a sound having a frequency higher than a relative maximum resonance frequency at which a sound absorption coefficient becomes a relative maximum among resonance frequencies of the resonance structure, the relative maximum resonance frequency is set to be lower than a sound insulation target frequency set for noise, and in a case where the sound insulation target frequency is indicated as fn and the relative maximum resonance frequency is indicated as fr, fn/fr is 1.05 to 1.50.

In the partition member, it is suitable that at least a part of each of the membrane-like member and the rear surface plate is fixed to the support body, and the vibration of the membrane-like member propagates from a part of the support body to which the membrane-like member is fixed to a part of the support body to which the rear surface plate is fixed.

In the partition member, it is suitable that the soundproof structure is formed by a plurality of membrane type resonators, the membrane-like member includes a fixed portion fixed to the opening surface, and a vibratable part located inside the fixed portion, each of the plurality of membrane type resonators absorbs a sound by the resonance structure in a case where the vibratable part of the membrane-like member vibrates, in each of the plurality of membrane type resonators, a sound absorption coefficient at a resonance frequency of at least one higher-order vibration mode present at 1 kHz or higher of the vibration of the vibratable part of the membrane-like member is higher than a sound absorption coefficient at a resonance frequency of a fundamental vibration mode, and the resonance frequency of the at least one higher-order vibration mode is set to be lower than the sound insulation target frequency.

In the partition member, it is suitable that in a case where a Young's modulus of the membrane-like member is indicated as E (Pa), a thickness of the membrane-like member is indicated as t (m), a thickness of the rear surface space is indicated as d (m), and a diameter or equivalent circle diameter of the vibratable part of the membrane-like member is indicated as $\Phi$ (m), a hardness $E \times t^3$ (Pa·m$^3$) of the membrane-like member is $21.6 \times d^{-1.25} \times \Phi^{4.15}$ or less.

Furthermore, it is more suitable that the hardness $E \times t^3$ (Pa·m$^3$) of the membrane-like member is $2.49 \times 10^{-7}$ or less.

In the partition member, it is suitable that the soundproof structure is formed by a plurality of membrane type resonators, and at least two membrane type resonators among the plurality of membrane type resonators are different from each other in kind.

In the partition member, the membrane-like member includes a fixed portion fixed to the opening surface, and a vibratable part located inside the fixed portion for each of the membrane type resonators, the fixed portion and the vibratable part provided for each of the membrane type resonators are disposed in the same membrane-like member, and a volume of the rear surface space is different between the at least two membrane type resonators that are different from each other in kind.

In the partition member, it is suitable that the soundproof structure is formed by a plurality of membrane type resonators, the membrane-like member includes a fixed portion fixed to the opening surface, and a vibratable part located inside the fixed portion, each of the plurality of membrane type resonators absorbs a sound by the resonance structure in a case where the vibratable part of the membrane-like member vibrates, and a through-hole is formed in the vibratable part of the membrane-like member in at least one of the plurality of membrane type resonators.

In the partition member, it is suitable that the soundproof structure further has a porous sound absorbing body provided in the rear surface space or at a position in contact with the membrane-like member.

In the partition member, it is suitable that the soundproof structure is disposed in a state where the membrane-like member faces the sound source side.

In the partition member, it is suitable that the soundproof structure is disposed on at least a part of a surface of the partition member.

In the partition member, it is suitable that a thickness of the membrane-like member is 10 μM to 200 μm.

In the partition member, it is suitable that a thickness of the rear surface space is 0.5 mm to 10 mm.

In the partition member, it is suitable that fn/fr is 1.10 to 1.35.

In addition, in order to solve the above-described problems, a vehicle of the present invention includes any one of the above-described partition members, in which the partition member is disposed between a space in which at least one of a motor, an inverter, an engine, or a tire is disposed, and a space in which an occupant rides.

Furthermore, in order to solve the above-described problems, an electronic device of the present invention includes the sound source in a housing; and any one of the above-described partition members is disposed in at least a part of the housing or in the housing.

According to the present invention, it is possible to provide a partition member including a soundproof structure capable of efficiently insulating noise with a lightweight configuration, and an electronic device and a vehicle using the partition member.

BRIEF DESCRIPTION OF THE DRAWINGS

FIG. 26 is a diagram showing a calculation result in a case where the transmission loss is simulated by changing the thickness of the membrane-like member from 60 µm to 100 µm in increments of 10 µm.

DESCRIPTION OF THE PREFERRED EMBODIMENTS

Figure 1:
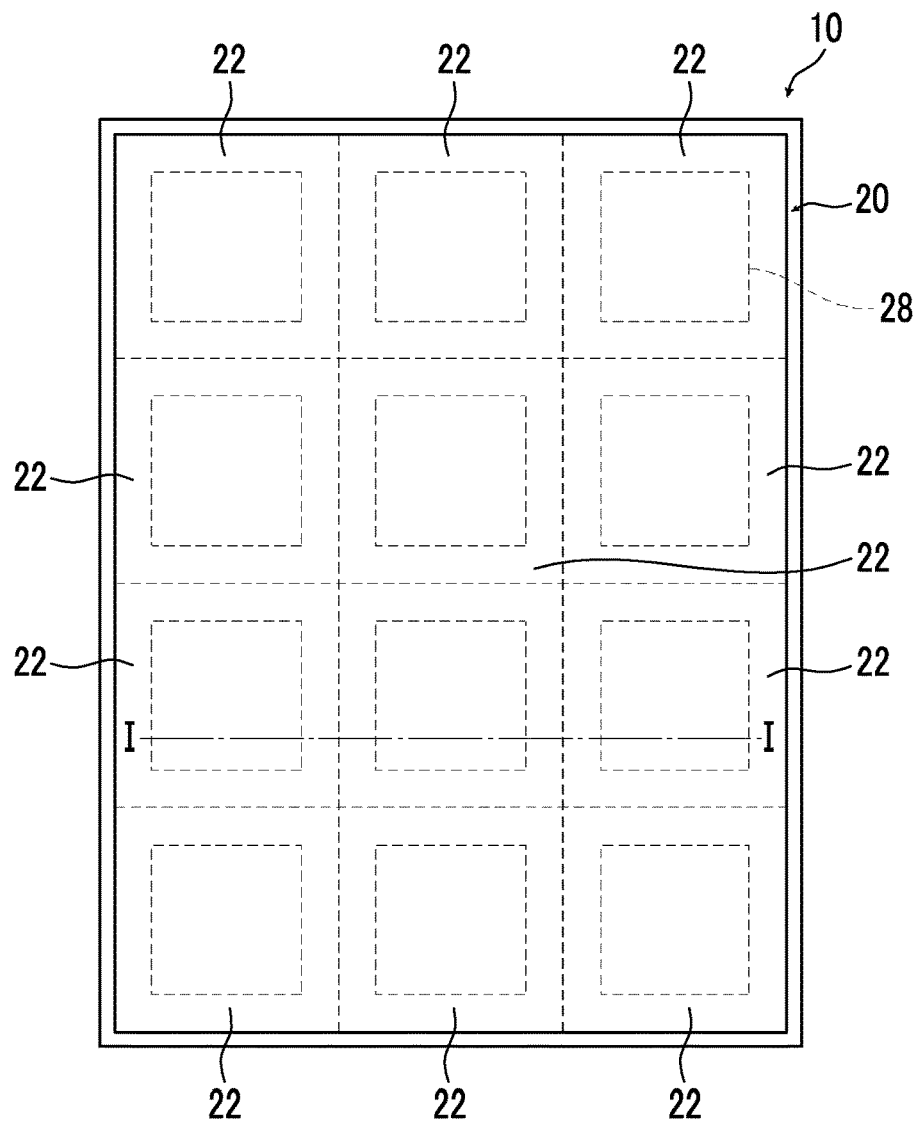
FIG. 1 is a schematic front view of a partition member according to an example of the present invention.

Hereinafter, the present invention will be described in detail. Descriptions of the configuration requirements described below may be made based on representative embodiments of the present invention, but the present invention is not limited to such embodiments.

In the present specification, a numerical range expressed using "to" means a range including numerical values described before and after "to" as a lower limit and an upper limit.

Furthermore, in the present specification, for example, angles such as "45°", "parallel", "perpendicular", or "orthogonal" are within a range in which the difference from a strict angle is less than 5 degrees unless otherwise specified. The difference from a strict angle is preferably less than 4 degrees, and more preferably less than 3 degrees.

In the present specification, "same", "similar" and "identical" include an error range generally accepted in the technical field. In addition, in the present specification, in a case of referring to "all", "any", "entire surface", and the like, in addition to the case of 100%, an error range generally accepted in the technical field is included, for example, a case of 99% or more, 95% or more, or 90% or more is included.

[Partition Member]

A partition member of the present invention is a member that partitions two spaces, and includes a soundproof structure that reduces noise emitted from a sound source on one side of the two spaces. The soundproof structure includes a support body having an opening, a membrane-like member fixed to an opening surface of the support body in which the opening is formed, and a rear surface plate fixed to the support body on the side opposite to the membrane-like member. The soundproof structure provides soundproofing by vibrating the membrane-like member as noise is incident on the membrane-like member. More specifically, the soundproof structure absorbs a sound a resonance structure formed by a rear surface space surrounded by the rear surface plate, the membrane-like member, and the support body and the membrane-like member. In addition, the soundproof structure insulates a sound having a frequency higher than a relative maximum resonance frequency at which a sound absorption coefficient becomes a relative maximum among resonance frequencies of the resonance structure. Here, the relative maximum resonance frequency is set to be lower than a sound insulation target frequency set for noise. Furthermore, in a case where the sound insulation target frequency is indicated as fn and the relative maximum resonance frequency is indicated as fr, fn/fr is 1.05 to 1.50.

In the partition member of the present invention configured as described above, the soundproof structure provided in the partition member can efficiently insulate noise with a lightweight configuration. As a result, it is possible to preferably perform soundproofing in an environment where sound insulation properties are particularly required as a soundproofing effect.

Here, "soundproofing" is a concept that includes both "sound insulation" and "sound absorption" as acoustic characteristics. "Sound insulation" means "sound is insulated", that is, "sound is not transmitted", and in easy terms, is "sound is reflected" (acoustic reflection), and "sound is canceled" (acoustic cancellation). "Sound absorption" means "sound is not reflected", that is, "the reflection of sound is reduced", and in easy terms, is "sound is absorbed" (acoustic absorption). (refer to Daijirin Japanese Dictionary of Sanseido (3rd edition) and http://www.onzai.or.jp/question/soundproof.html and http://www.onzai.or.jp/pdf/new/gijutsu201312_3.pdf of web pages of Acoustic Materials Association of Japan.

In addition, "sound insulation target frequency" corresponds to, for example, a frequency band in which the sound pressure of noise is a peak sound having a narrow frequency width, and more specifically, a specific frequency of noise.

Figure 2:
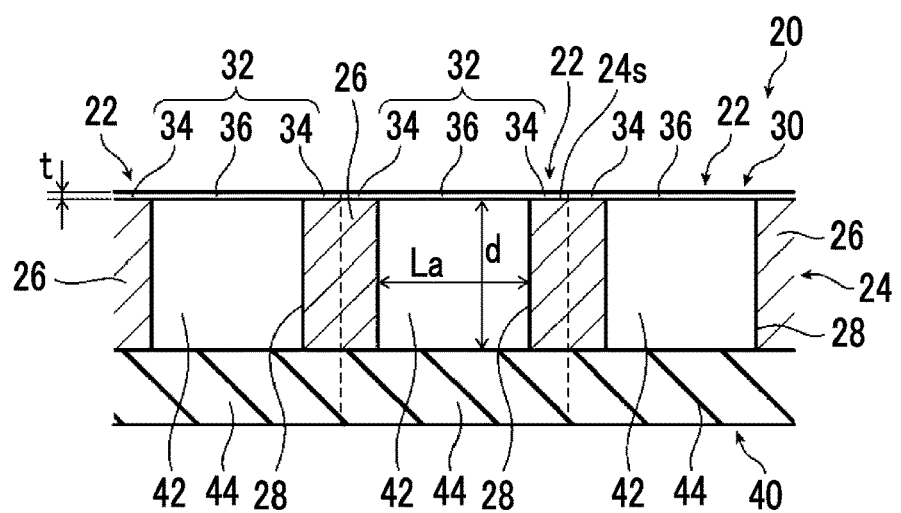
FIG. 2 is a schematic view illustrating a I-I cross section of FIG. 1.

Hereinafter, an example of the partition member of the present invention (hereinafter, partition member 10) will be described with reference to FIGS. 1 and 2. FIG. 1 is a schematic front view of the partition member 10. FIG. 2 is a schematic cross-sectional view of a soundproof structure 20 included in the partition member 10, and is a view illustrating a I-I cross section of FIG. 1.

The partition member 10 is a member that partitions two spaces as described above, and is a substantially plate-shaped member (for example, panel or board) used as a wall, a ceiling, a floor, a door, a partition, a partition material disposed inside a device or an apparatus, a housing, a case cover, and the like. The partition member 10 partitions the two spaces together with its peripheral member (for example, an adjacent wall member) without any gap (strictly speaking, a case where a slight air gap remains is included).

A sound source is disposed on one side of the two spaces partitioned by the partition member 10. Examples of the sound source include rotating components such as a motor and a fan; electronic components such as an inverter, a power supply, a booster, a power control unit (PCU) including a boost converter and an inverter, a large-capacity capacitor, a ceramic capacitor, an inductor, a coil, and an electric control device such as a switching power supply and a transformer; and mechanical components such as a moving mechanism by a gear or an actuator.

A sound (noise) is generated from the sound source, and the noise propagates through the air. More specifically, in a case where the sound source is an electronic component such as an inverter, a sound (switching noise) corresponding to a carrier frequency is generated. In a case where the sound source is a rotating device such as a motor or a fan, a sound (electromagnetic noise) having a frequency corresponding to the rotation speed thereof is generated. At this time, the frequency of the sound to be generated is not necessarily limited to the rotation speed or a multiple thereof, but there is a strong relationship that a higher frequency sound is generated by increasing the rotation speed. That is, each sound source generates a sound having a frequency unique to the sound source. Many sound sources that generate sound at a natural frequency have a physical or electrical mechanism that generates vibration at a specific frequency. For example, a rotating system such as a fan emits a sound having a frequency determined by a value obtained by multiplying the rotation speed thereof by the number of blades, or a sound having a frequency that is a multiple thereof. In addition, a part of an inverter or the like that receives an AC electric signal generates a sound corresponding to the AC frequency thereof.

Whether or not a sound source has a natural frequency can be determined by the following experiment.

The sound source is disposed in an anechoic chamber, a semi-anechoic chamber, or a space surrounded by a sound absorbing body such as urethane. By disposing the sound absorbing body around the sound source as described above, it is possible to eliminate the influence of the reflection interference of the chamber and a measurement system. Then, a sound is generated from the sound source, the sound is collected by a microphone from a position distant from the sound source and measured, and the frequency information thereof is acquired. The distance between the sound source and the microphone can be appropriately selected according to the size of the sound source and the measurement system, but it is desirable that the distance is about 30 cm or more.

The partition member 10 includes the soundproof structure 20 illustrated in FIGS. 1 and 2. The soundproof structure 20 reduces noise emitted from the sound source. As a result, of the two spaces partitioned by the partition member 10, the propagation of noise from the space where the sound source is installed to the space where the sound source is not installed is suppressed.

The soundproof structure 20 forms at least a part of the surface of the partition member 10, and in the configuration illustrated in FIG. 1, forms substantially the entire surface of the partition member 10 except for the edge portion. However, the soundproof structure 20 is not limited thereto, and a part (for example, the central part) of the surface of the partition member 10 may be formed by the soundproof structure 20. In addition, the soundproof structure 20 may be attached to the outer surface of the partition member 10, or the soundproof structure 20 may be disposed inside the partition member 10.

The partition member 10 can be suitably used as a partition in a building. In a case where the partition member 10 is used as a partition for a building, for example, in a chamber (room) partitioned by the partition member 10, it is possible to suppress the propagation of a sound (strictly speaking, insulate a sound) generated from a sound source in another room.

As the partition for a building, there are walls, doors, partitions and screens, shutters, floors, and ceilings.

Moreover, the partition member 10 can be suitably used in an electronic device that includes a sound source in a space surrounded by an outer wall. Specifically, the partition member 10 may be disposed in at least a portion of the housing or in the housing of the electronic device. With such a configuration, it is possible to suppress the propagation of noise (specifically, insulate a sound) emitted from the sound source inside the electronic device to the outside of the electronic device. In particular, in a case where the partition member 10 is used as a cover for a sound source (for example, a motor, an inverter, or a power control unit) provided in a space surrounded by an outer wall, a characteristic noise emitted from the sound source, for example, a single frequency sound is suppressed (a sound is insulated).

As the electronic device, there are household appliances such as air conditioners, outdoor units of air conditioners, water heaters, ventilation fans, refrigerators, vacuum cleaners, air purifiers, electric fans, dishwashers, microwave ovens, washing machines, televisions, mobile phones, smartphones, and printers; office equipment such as copiers, projectors, desktop personal computers (PCs), notebook PCs, monitors, and shredders; computer equipment that uses high power such as servers and supercomputers; and scientific experiment equipment such as thermostatic chambers, environmental testers, dryers, ultrasonic cleaners, centrifuges, washers, spin coaters, bar coaters, and carriers.

Moreover, the partition member 10 can be suitably used in a vehicle in which an occupant rides. Specifically, the partition member 10 may be disposed between a space in which at least one of the motor, the inverter, the engine, or the tire is disposed, and a space in which an occupant rides. More specifically, the partition member 10 including the soundproof structure 20 may be disposed between the seat on which the occupant sits and the sound source. For example, in a hybrid car or an electric car, in a case where the motor is disposed on the lower surface of the car, the axle, or the tire portion, it is desirable to dispose a vehicle cabin floor including the partition member 10 between the motor and the vehicle cabin. In a case where the motor and the inverter are accommodated in the front part (the part corresponding to the engine compartment of a gasoline vehicle) of the hybrid car or the electric car, it is desirable to dispose a dash insulator including the partition member 10 between the motor and the inverter, and the vehicle cabin. According to the above configuration, it is possible to suppress the propagation of noise emitted from the sound source in the vehicle to the place of the occupant (the space where the occupant is present) and to insulate the noise.

As the vehicle, there are electric cars (including buses or taxis), trains, aviation equipment (airplanes, fighters, helicopters, or the like), ships, aerospace equipment (rockets and the like), and personal mobility devices. In particular, in a hybrid car, an electric car, and a plug-in hybrid vehicle (PHV), a peculiar noise caused by a motor and a power control unit (including an inverter and a battery voltage boosting unit) installed inside the car and heard in the vehicle cabin becomes a problem.

<Soundproof Structure>

Figure 3:
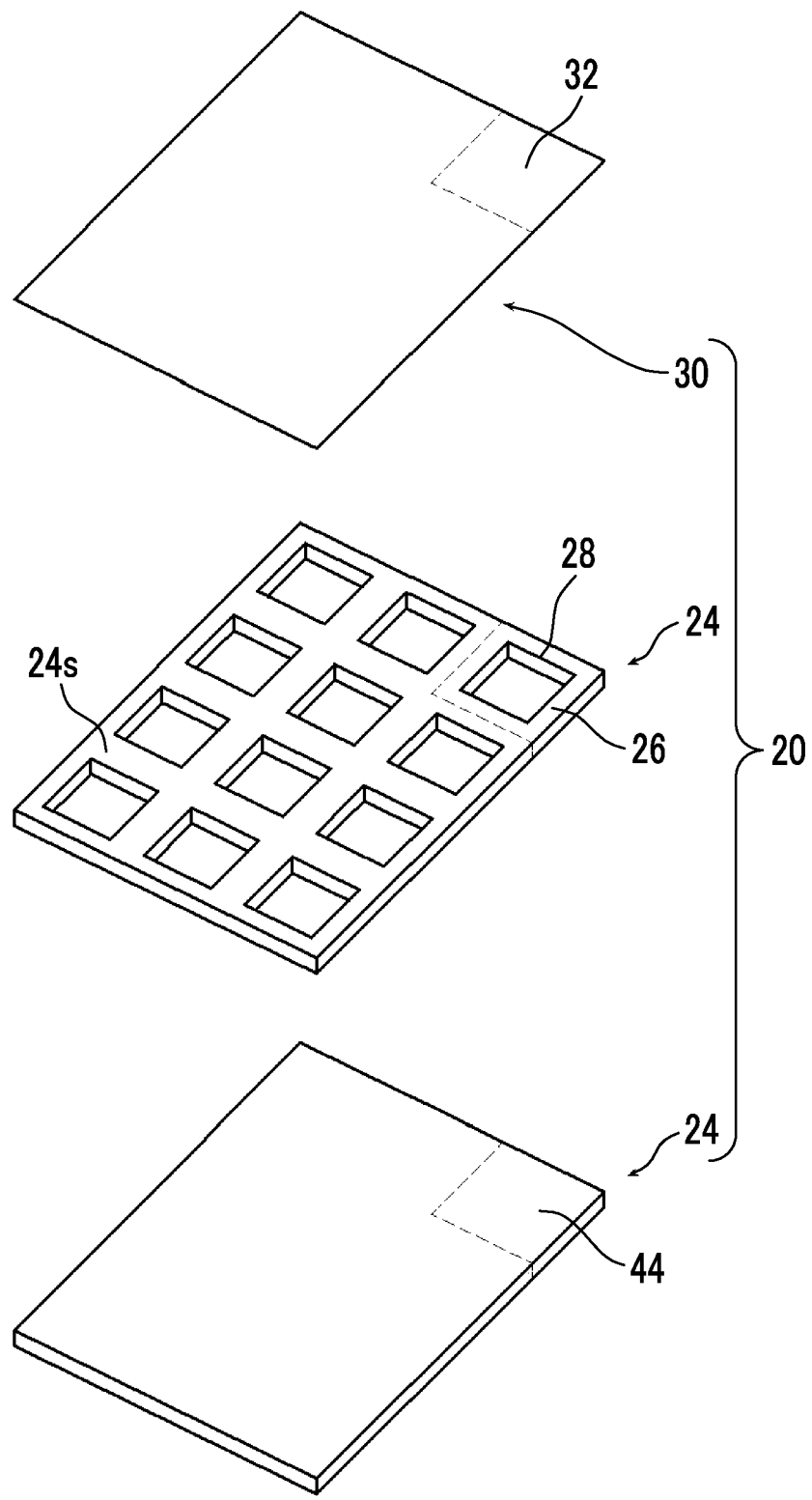
FIG. 3 is an exploded view of a soundproof structure included in the partition member of the present invention.

The soundproof structure (hereinafter, soundproof structure 20) included in the partition member 10 of the present invention will be described with reference to FIGS. 2 and 3. FIG. 3 is an exploded view of the soundproof structure 20. In FIG. 3, a frame 26 that forms a support body 24, a membrane 32 that forms a membrane-like member 30, and a plate body 44 that forms a rear surface plate 40 are each illustrated singly by broken lines.

The soundproof structure 20 reduces noise that propagates through the air from one of the two spaces partitioned by the partition member 10 in a state where there is no gap (or a slight gap is formed) to the other. The configuration of the soundproof structure 20 is briefly described. As illustrated in FIGS. 2 and 3, the soundproof structure 20 includes the support body 24, the membrane-like member 30, and the rear surface plate 40 as primary constituent elements.

The support body 24 is a member having openings 28, and supports the membrane-like member 30 in a vibratable state. The membrane-like member 30 is formed of a sheet, a film, or a thin plate, and is fixed to an opening surface 24s of the support body 24 where the openings 28 are formed at a position where the openings 28 are closed. The membrane-like member 30 vibrates as noise is incident on a part of the surface thereof facing the opening 28. That is, the membrane-like member 30 is fixed to the support body 24 in a state of covering the opening surface 24s of the support body 24, and is thus vibratably supported by the support body 24.

The rear surface plate 40 is a plate body having a sufficient thickness and a plane size, and, for example, in a case where the partition member 10 is a wall body, the rear surface plate 40 forms a main body part of the wall body. The rear surface plate 40 is fixed to the support body 24 on the side opposite to the membrane-like member 30. More specifically, the rear surface plate 40 is fixed to the support body 24 so as to close the openings 28 on the side opposite to the membrane-like member 30. Accordingly, in the soundproof structure 20, a space surrounded by the rear surface plate 40, the membrane-like member 30, and the support body 24 (hereinafter, rear surface space 42) is formed. In the configuration illustrated in FIG. 2, the rear surface space 42 is a closed space.

Each of the membrane-like member 30 and the rear surface plate 40 is fixed to the support body 24 by at least a part of each thereof, as described above. Therefore, in a case where the membrane-like member 30 vibrates, the vibration propagates from the part of the support body 24 to which the membrane-like member 30 is fixed to the part to which the rear surface plate 40 is fixed.

The soundproof structure 20 configured as described above absorbs sound by the resonance structure (strictly, a membrane type resonance structure) configured by the membrane-like member 30 and the rear surface space 42. That is, the soundproof mechanism of the soundproof structure 20 is formed by using the membrane-like member 30 as a mass spring component and the rear surface space 42 as an air spring component. In a case where noise is incident on the membrane-like member 30, the membrane-like member 30 vibrates at a resonance frequency, and in conjunction with this, the air in the rear surface space 42 repeats adiabatic compression and adiabatic expansion. Accordingly, the energy of the noise is converted by heat energy and the noise is absorbed.

Here, among the resonance frequencies of the above resonance structure, there is a resonance frequency at which the sound absorption coefficient reaches a relative maximum value (hereinafter, also referred to as a peak). This peak frequency (that is, relative maximum resonance frequency, which will be simply referred to as "resonance frequency" for convenience hereinafter) can be easily adjusted by changing the density and weight of the membrane-like member 30, the thickness of the rear surface space 42, and the like.

For the purpose of more effective soundproofing of noise, in the partition member 10, the soundproof structure 20 is preferably disposed with the membrane-like member 30 facing the sound source side. However, the direction of the soundproof structure 20 in a case where the partition member 10 is disposed (specifically, the direction in which the membrane-like member 30 is directed) is not particularly limited, and may be appropriately set according to the application and the like.

Next, a detailed configuration of the soundproof structure 20 will be described. As illustrated in FIG. 1, the soundproof structure 20 is formed by a plurality of (in the configuration illustrated in FIG. 1, 4 vertical×3 horizontal, a total of 12) membrane type resonating bodies 22 arranged on a plane. In other words, the soundproof structure 20 of the present invention is formed by, with one membrane type resonating body 22 as one unit (cell), integrating a plurality of cells continuously arranged as one unit. The number of membrane type resonating bodies 22 forming the soundproof structure 20 is not particularly limited, and may be only one or may be two or more.

Each of the plurality of membrane type resonating bodies 22 is formed by the membrane-like member 30, the support body 24, and the rear surface plate 40. In the configuration illustrated in FIG. 3, the plurality of membrane type resonating bodies 22 are simultaneously created by overlapping (stacking) one membrane-like member 30, one support body 24, and one rear surface plate 40. Hereinafter, each of the membrane-like member 30, the support body 24, and the rear surface plate 40 will be described in detail.

As illustrated in FIG. 3, the support body 24 is formed by disposing a plurality of rectangular frames 26. More specifically, one or more the plurality of frames 26 arranged in a raw (frame row) are provided in a direction orthogonal to the frame row. In each frame 26, the opening 28 having a substantially square opening shape as viewed in a plan view is formed.

Each frame 26 forms the membrane type resonating body 22. A corresponding membrane 32 in the membrane-like member 30 is fixed to one end surface of each frame 26 (an end surface of the frame 26 in a thickness direction) so as to close the opening 28. Accordingly, each frame 26 supports the corresponding membrane 32 in a vibratable state. The rear surface space 42 corresponding to the size and shape of the frame 26 is formed on the back side of the membrane 32.

Figure 4:
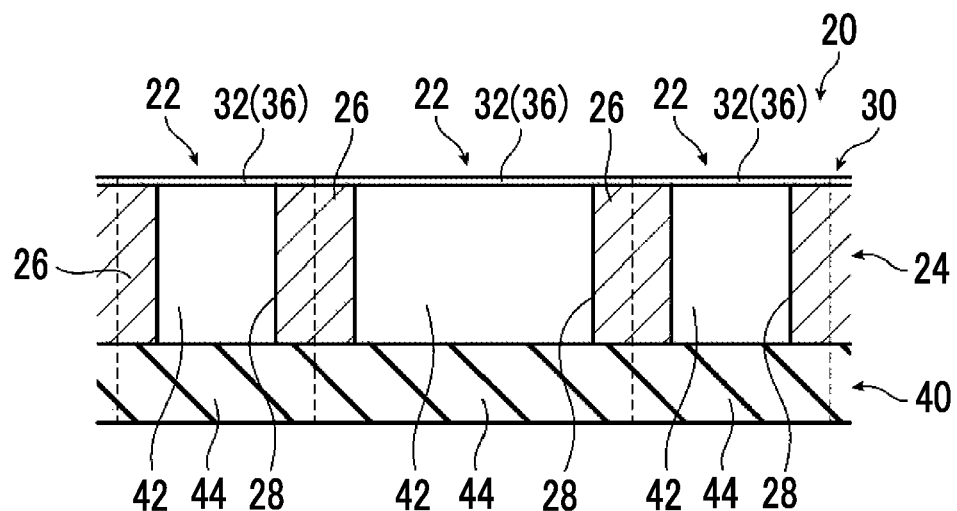
FIG. 4 is a view illustrating a modification example of the soundproof structure, and is a cross-sectional view of a configuration in which the sizes of frames are different.

In the configuration illustrated in FIG. 2, the size and shape of the frames 26 (strictly speaking, the size and shape in the plan view) are uniform between the membrane type resonating bodies 22. However, the size and shape of the frame 26 are not limited thereto and may be different between at least two membrane type resonating bodies 22, as illustrated in FIG. 4. FIG. 4 is a view illustrating a modification example of the soundproof structure 20, and is a cross-sectional view of a configuration in which the sizes of the frames 26 are different.

In the configuration illustrated in FIG. 4, in a case where the sizes and shapes of the frames 26 are different, the areas of the vibrating parts of the membranes 32 and the volumes of the rear surface spaces 42 are different. The difference in these conditions means that the kinds of the membrane type resonating body 22 in which the vibrating parts of the membranes 32 and the rear surface spaces 42 are formed are different. That is, the plurality of membrane type resonating bodies 22 may all be of the same type, or the kinds of at least two membrane type resonating bodies 22 may be different from each other. In other words, the volumes of the rear surface spaces 42 may be different between at least two membrane type resonating bodies 22.

The opening shape of the opening 28 is not particularly limited, and may be, for example, another quadrangle such as a rectangle, a rhombus, a parallelogram, and a trapezoid, a triangle including an equilateral triangle, a right triangle, and an isosceles triangle, a polygon including a regular polygon such as a regular hexagon and a regular pentagon, a circle, an ellipse, or the like, or may be an irregular shape. The frame 26 preferably has a closed cross-sectional structure that surrounds the entire periphery of the opening 28, but is not limited thereto. The frame 26 may also have a discontinuous structure in which a part around the opening 28 is absent.

The material of each frame 26, that is, the material of the support body 24 is not particularly limited as long as the material can support the membrane 32, has a strength suitable for application to a sound source of noise, and is resistant to a soundproof environment, and can be selected according to the sound source, the soundproof environment, and the like. Examples of the material of the support body 24 include a metal material, a resin material, a reinforced plastic material, and a carbon fiber. Examples of the metal material include metal materials such as aluminum, titanium, magnesium, tungsten, iron, steel, chromium, chromium molybdenum, nichrome molybdenum, copper, and alloys thereof. Examples of the resin material include resin materials such as an acrylic resin, polymethylmethacrylate, polycarbonate, polyamidimide, polyarylate, polyetherimide, polyacetal, polyetheretherketone, polyphenylene sulfide, polysulfone, polyethylene terephthalate, polybutylene terephthalate, polyimide, an acrylonitrile butadiene styrene copolymer synthetic resin (ABS resin), polypropylene, and triacetyl cellulose. As the reinforced plastic material, there are carbon fiber reinforced plastics (CFRP) and glass fiber reinforced plastics (GFRP). Furthermore, natural rubber, chloroprene rubber, butyl rubber, ethylene propylene diene rubber (EPDM), silicone rubber, and the like, and rubbers containing crosslinked structures thereof can also be used. Among the above-mentioned materials, some kinds of materials may be used in combination.

As the material of the support body 24, a honeycomb core material can also be used. Since the honeycomb core material is used as a lightweight and highly rigid material, it is easy to obtain a ready-made product. As an example, a honeycomb core material formed of various materials such as an aluminum honeycomb core, an FRP honeycomb core, a paper honeycomb core (manufactured by Shin Nippon Feather Core Co., Ltd., manufactured by Showa Aircraft Industry Co., Ltd., or the like), and a honeycomb core (TECCELL manufactured by Gifu Plastic Industry Co., Ltd., or the like) made of a thermoplastic resin (specifically, polypropylene (PP), polyethylene terephthalate (PET), polyethylene (PE), polycarbonate (PC) or the like) can be used as the support body 24.

As the material of the support body 24, a foam material, a hollow material, or a porous material can also be used. In a case of using a large number of membrane type soundproof structures, in order to provide a configuration in which air does not pass between cells, the frame can be formed using, for example, a closed cell foam material. Specifically, for example, various materials such as closed cell polyurethane, closed cell polystyrene, closed cell polypropylene, closed cell polyethylene, and closed cell rubber sponge can be selected. Compared to open cells, closed cells are impermeable to sound, water, and gas, and have a high structural strength, so that the closed cells are suitable for use as the material of the support body 24. In a case where a porous sound absorbing body 50, which will be described later, has sufficient supportability, the support body 24 may be formed of only the porous sound absorbing body, and the materials mentioned as the materials of the porous sound absorbing body 50 and the support body 24 may be used in combination, for example, by mixing or kneading. By using a material system containing air therein as described above, a reduction in the weight of the device can be achieved, and furthermore heat insulating properties can be imparted.

In the configuration illustrated in FIG. 3, the support body 24 is formed as one assembly of the plurality of frames 26 integrated, specifically, is formed by a grid-shaped member having a plurality of parts extending in two directions orthogonal to each other. However, the support body 24 is not limited thereto, and a configuration in which the frames 26 are separated (that is, the support bodies 24 are separated for the respective membrane type resonating bodies 22) may be adopted.

The membrane-like member 30 is formed by arranging a plurality of rectangular membranes 32. The membranes 32 are elements that form the membrane type resonating bodies 22, and are provided in the same number as the membrane type resonating bodies 22, that is, in the same number as the frames 26 in the membrane-like member 30. The membranes 32 in the membrane-like member 30 and the frames 26 in the support body 24 respectively correspond to each other. For example, the membrane 32 located at the upper right corner of the membrane-like member 30 in a front view corresponds to the frame 26 located at the upper right corner of the support body 24. Each membrane 32 is fixed to one end surface (opening surface 24s) of the corresponding frame 26 at a position where the opening 28 is closed.

As illustrated in FIG. 2, each membrane 32 (membrane-like member 30) has a fixed portion 34 fixed to the opening surface 24s of the corresponding frame 26 (support body 24) and a vibratable part 36 located inside the fixed portion 34. The fixed portion 34 is located at the outer edge portion of the membrane 32, and is fixed to a part (edge portion) of the corresponding frame 26 around the opening 28. The vibratable part 36 has a substantially square shape and is a part facing the opening 28. The shape of the vibratable part 36 is not particularly limited and is determined according to the opening shape of the frame 26. Therefore, for example, in a case where the opening shape is circular, the vibratable part 36 of the membrane 32 is also circular.

In the configuration illustrated in FIGS. 2 and 3, the size and shape (size and shape in the plan view) of the vibratable parts 36 of the membranes 32 are uniform between the membrane type resonating bodies 22. However, the size and shape of the vibratable part 36 of the membrane 32 are not limited thereto, and may be different between at least two membrane type resonating bodies 22. Here, the size of the vibratable part 36 is represented by, in a case of a shape other than a circle, an equivalent circle diameter (the diameter of a circle having the same area as that of the shape), and is represented by, in a case of a circular shape, the diameter of the circle.

A method of fixing the membrane 32 to the frame 26 is not particularly limited, and any method can be used without limitation as long as the membrane 32 is fixed to the frame 26 in a vibratable state. For example, a method using a double-sided tape or an adhesive, or a method using a physical fixing tool can be adopted. In a case of using a double-sided tape, for example, ultra high temperature double coated tape 9077 manufactured by 3M can be adopted. In a case of using an adhesive, for example, the adhesive is applied onto one end surface (opening surface 24s) of the frame 26, and the membrane 32 is placed on the applied adhesive and fixed to the frame 26. Examples of the adhesive include an epoxy-based adhesive (ARALDITE (registered trademark) (manufactured by NICHIBAN Co., Ltd.), or the like), a cyanoacrylate-based adhesive (Aron Alpha (registered trademark) (manufactured by NICHIBAN Co., Ltd.), and an acrylic adhesive. In a case of using a physical fixing tool, for example, the membrane 32 disposed at a position that closes the opening 28 is sandwiched between the frame 26 and a fixing member (not illustrated) such as a rod, and the fixing member is fastened to the frame 26 using the fixing tool such as a screw to fix the membrane 32 to the frame 26.

The material of each membrane 32, that is, the material of the membrane-like member 30 is not particularly limited as long as the material has a strength suitable for application to a sound source of noise, is resistant to a soundproof environment, and can vibrate in a case where noise is incident, and can be selected according to the sound source, the soundproof environment, and the like. For example, as the material of the membrane-like member 30, various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride (PVDC), polyethylene (PE), polyvinyl chloride (PVC), polymethylpentene (PMP), a cyclo olefin polymer (COP), ZEONOR, polycarbonate, polyethylene naphthalate (PEN), polypropylene (PP), polystyrene (PS), polyarylate (PAR), Aramid, polyphenylene sulfide (PPS), polyethersulfone (PES), Nylon, polyester (PEs), a cyclic olefin copolymer (COC), diacetyl cellulose, nitrocellulose, a ellulose derivative, polyamide, polyamideimide, polyoxymethylene (POM), polyetherimide (PEI), polyrotaxane (slide-ring material or the like), and polyimide can be used. Furthermore, glass materials such as thin film glass, and fiber reinforced plastic materials such as carbon fiber reinforced plastic (CFRP) and glass fiber reinforced plastic (GFRP) can also be used. In addition, natural rubber, chloroprene rubber, butyl rubber, ethylene propylene diene methylene linkage (EPDM), silicone rubber, and the like, and rubbers containing a crosslinked structure thereof can be used. Alternatively, a combination of the materials listed above may be used.

In a case of using a metal material, the surface may be plated with metal from the viewpoint of suppressing rust or the like.

In a system in which the environmental temperature changes, it is desirable that the material of the frame 26 and the material of the membrane 32 are the same, or at least the thermal expansion coefficients (linear expansion coefficients) of both materials are close to each other. In a case where the thermal expansion coefficients of the frame 26 and the membrane 32 are greatly different from each other, the frame 26 and the membrane 32 are different in the amount of displacement in a case where the environmental temperature changes, and thus strain is likely to occur in the membrane 32. Since the strain and the tension change affect the resonance frequency of the membrane 32, the silencing frequency is likely to change with the temperature change, and even in a case where the temperature returns to the original temperature, there are cases where the strain does not relax and the silencing frequency remains changed. On the other hand, in a case where the thermal expansion coefficients are set to be close to each other, the frame 26 and the membrane 32 are similarly expanded and contracted, so that strain is less likely to occur, resulting in a system that is stable against changes in the environmental temperature.

Furthermore, in the configuration illustrated in FIG. 3, the membrane-like member 30 forms one wide plate body by connecting a plurality of membranes 32. That is, in the configuration illustrated in FIG. 3, the membranes 32 (the fixed portions 34 and the vibratable parts 36) provided for the respective membrane type resonating bodies 22 are disposed in the same membrane-like member 30. With such a configuration, by overlapping and fixing the membrane-like members 30 to the support body 24 so as to cover the entire opening surface 24s of the support body 24, it is possible to collectively fix the membranes 32 to all the frames 26 in the support body 24. Accordingly, in each of the plurality of membrane type resonating bodies 22, the membranes 32 can be fixed to the frames 26 in a state where the membranes 32 are located on the same plane (without a step).

However, the configuration is not limited thereto, and a configuration in which the membranes 32 are separated (that is, the membrane-like members 30 are separated for the respective membrane type resonating bodies 22) may be adopted. In such a configuration, the respective membrane-like members 30 of the membrane type resonating bodies 22 are individually fixed to the frames 26 (support body 24). Alternatively, as an intermediate therebetween, the membrane-like member 30 having a strip shape (the membrane-like member 30 formed into a size corresponding to the plurality of membranes 32 connected) is fixed to two or more continuous frames 26 among the plurality of frames 26, and the single-cut membrane-like members 30 (the membrane-like members 30 formed into a size of the single membrane 32) may be individually fixed to the remaining frames 26.

In a case where the membrane-like members 30 are divided for the respective membrane type resonating bodies 22, the thickness and material of each membrane-like member 30 (that is, the membrane 32) may be uniform between the membrane-like members 30. Alternatively, at least two or more membrane-like members 30 may be different.

The rear surface plate 40 may be formed of a single plate body, or may be formed by arranging a plurality of rectangular plate bodies 44. In the following, a configuration in which the rear surface plate 40 is formed by a plurality of plate bodies 44 will be described as an example. The plate bodies 44 are elements that form the membrane type resonating bodies 22, and are provided in the same number as the membrane type resonating bodies 22, that is, in the same number as the frames 26 in the rear surface plate 40. The plate bodies 44 in the rear surface plate 40 and the frames 26 in the support body 24 respectively correspond to each other. For example, the plate body 44 located at the upper right corner of the rear surface plate 40 in the front view corresponds to the frame 26 located at the upper right corner of the support body 24. Each plate body 44 is fixed to the corresponding frame 26 at a position where the opening 28 is closed on the side opposite to the membrane 32. More specifically, as illustrated in FIG. 2, each plate body 44 has a surface of the same size as the end surface of the corresponding frame 26 on the side opposite to the membrane 32, and is fixed by joining the outer edge portion of the surface to the outer edge portion of the end surface of the frame 26 (peripheral portion of the opening 28).

In the configuration illustrated in FIGS. 2 and 3, the size and shape of the plate bodies 44 (the size and shape in the plan view) are uniform between the membrane type resonating bodies 22. However, the size and shape of the plate bodies 44 are not limited thereto. For example, in a case where the size and shape of the frames 26 are different between the membrane type resonating bodies 22, the size and shape of the plate bodies 44 may also different between the membrane type resonating bodies 22 in a form corresponding thereto.

A method of fixing the plate body 44 to the frame 26 is not particularly limited, and any method can be used without limitation as long as the plate body 44 is fixed to the frame 26 so as to close the opening 28 on the opposite side of the membrane 32. For example, a method using a double-sided tape or an adhesive, or a method using a physical fixing tool can be adopted. In a case of using a double-sided tape, the above-mentioned double-sided tape can be used. In a case of using an adhesive, for example, the adhesive is applied onto the end surface (the end surface opposite to the membrane 32) of the frame 26, and the plate body 44 is placed on the applied adhesive and fixed to the frame 26. As the adhesive, the adhesives listed above can be used. Alternatively, the frame 26 may be fixed by applying an adhesive to the rear surface plate 40 side formed by the plate body 44. Even if the adhesive is applied to the entire rear surface plate 40, acoustic characteristics can be obtained in a case where the rear surface space 42 is secured. In the case of using a physical fixing tool, for example, the outer edge portion of the plate body 44 is abutted against the outer edge portion of the end surface of the frame 26, and the outer edge portions are fastened to each other by the fixing tool such as a screw to fix the plate body 44 to the frame 26.

Figure 5:
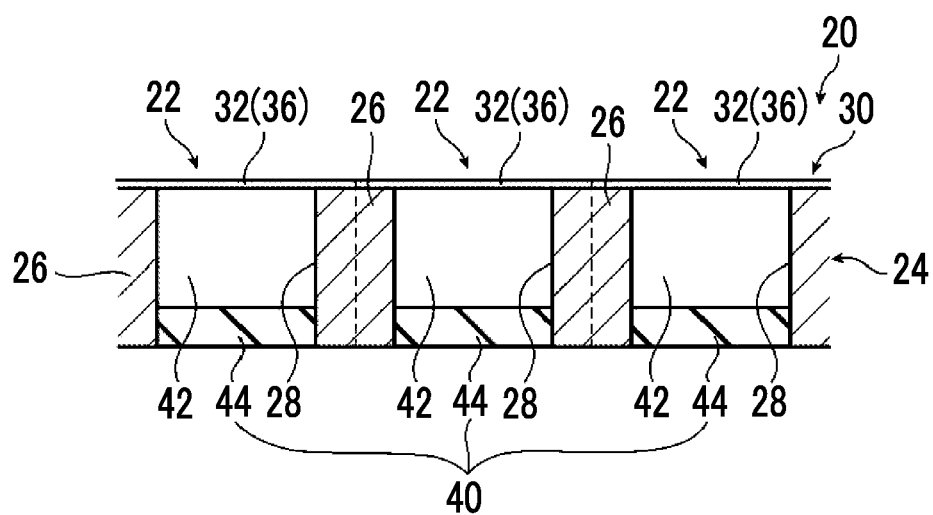
FIG. 5 is a view illustrating a modification example of the soundproof structure, and is a cross-sectional view illustrating a configuration in which a plate body is fitted into an opening of the frame.

Regarding the position in the frame 26 to which the plate body 44 is fixed, the plate body 44 may be fixed to the end surface of the frame 26 as illustrated in FIG. 3. Alternatively, as illustrated in FIG. 5, the plate body 44 which is formed corresponding to the outer edge of the opening 28 is fitted into the opening 28 formed in the frame 26, and the side end of the plate body 44 and the inner wall surface of the opening 28 are joined and fixed to each other. FIG. 5 is a view illustrating a modification example of the soundproof structure 20, and is a cross-sectional view illustrating a configuration in which the plate body 44 is fitted into the opening 28 of the frame 26.

The material of each plate body 44, that is, the material of the rear surface plate 40 is not particularly limited as long as the material has a strength suitable for application to a sound source of noise and is resistant to a soundproof environment, and can be selected according to the sound source, the soundproof environment, and the like. Specifically, as the material of the support body 24, the above-mentioned materials can be adopted. In addition, among the materials listed as the material of the support body 24, a plurality of kinds may be combined and used as the material of the rear surface plate 40. Furthermore, as the material of the rear surface plate 40, similar to the support body 24, a honeycomb core material can be used. As the honeycomb core material used as the rear surface plate 40, it is possible to use the same material as the above-mentioned honeycomb core material as the material of the support body 24.

In the configuration illustrated in FIG. 3, the rear surface plate 40 forms one wide board body by connecting a plurality of plate bodies 44. With such a configuration, by overlapping and fixing the rear surface plate 40 so as to cover the entire end surface of the support body 24 located on the side opposite to the membrane-like member 30, it is possible to collectively fix the plate bodies 44 to all the frames 26 in the support body 24. However, the configuration is not limited thereto, and a configuration in which the plate bodies 44 are separated (that is, the rear surface plates 40 are separated for the respective membrane type resonating bodies 22) may be adopted. In such a configuration, the respective rear surface plates 40 of the membrane type resonating bodies 22 are individually fixed to the frames 26 (support body 24). Alternatively, as an intermediate therebetween, the rear surface plate 40 formed into a size corresponding to the plurality of plate bodies 44 connected is fixed to two or more continuous frames 26 among the plurality of frames 26, and the rear surface plates 40 formed into the size of the single plate body 44 are individually fixed to the remaining frames 26.

According to the soundproof structure 20 configured as described above, each of the plurality of membrane type resonating bodies 22 absorbs a sound by its resonance structure (strictly speaking, a membrane type resonance structure) in a case where noise is incident on the vibratable part 36 of the membrane 32 (the membrane-like member 30) and the vibratable part 36 vibrates. At this time, each of the membrane type resonating bodies 22 may be designed such that the sound absorption coefficient at a resonance frequency of at least one higher-order vibration mode present at 1 kHz or higher of the vibration of the vibratable part 36 of the membrane 32 (membrane-like member 30) is higher than the sound absorption coefficient at a resonance frequency of a fundamental vibration mode (refer to, for example, FIG. 8). Such a state can be realized by appropriately adjusting the thickness of the rear surface space 42 and the size, thickness, hardness, and the like of the membrane-like member 30 (strictly speaking, the vibratable part 36 of each membrane 32).

More specifically, the thickness (indicated by symbol d in FIG. 2) of the rear surface space 42 is preferably 20 mm or less, more preferably 10 mm or less, and even more preferably 0.5 mm to 6 mm for miniaturization and sound absorption due to higher-order vibration, still more preferably 1 mm to 5 mm, still more preferably 1 mm to 3 mm, and particularly preferably 1 mm to 2 mm from the viewpoint of further miniaturization of the membrane type resonating body 22. In a case where the thickness of the rear surface space 42 is not uniform, the average value may be within the above range.

The thickness of the membrane-like member 30 (indicated by symbol t in FIG. 2) is preferably 10 μm to 200 μm, more preferably 20 μm to 150 μm, and even more preferably 30 μm to 100 μm. In a case where the thickness of the membrane-like member 30 is not uniform, the average value may be within the above range.

The Young's modulus indicating the hardness of the membrane-like member 30 is preferably 1000 Pa to 1000 GPa, more preferably 10000 Pa to 500 GPa, and particularly preferably 1 MPa to 300 GPa. In a case where the Young's modulus of the membrane-like member 30 is not uniform, the average value may be within the above range.

The density of the membrane-like member 30, it is preferably 10 kg/m$^3$ to 30,000 kg/m$^3$, more preferably 100 kg/m$^3$ to 20,000 kg/m$^3$, and particularly preferably 500 kg/m$^3$ to 10,000 kg/m$^3$. In addition, in a case where the density of the membrane-like member 30 is not uniform, the average value may be within the above range.

The size of the membrane-like member 30, more specifically, the diameter or equivalent circle diameter (indicated by symbol La in FIG. 2) of the vibratable part 36 of the membrane 32 is preferably 1 mm to 100 mm, more preferably 3 mm to 70 mm and particularly preferably 5 mm to 50 mm.

Here, the present inventors examined in more detail the mechanism by which the higher-order vibration modes are excited in the soundproof structure 20. As a result, it was found that in a case where the Young's modulus of the membrane-like member 30 is indicated as E (Pa), the thickness of the membrane-like member 30 is indicated as t (m), the thickness (rear surface distance) of the rear surface space 42 is indicated as d (m), and the diameter or equivalent circle diameter of the vibratable part 36 of the membrane-like member 30 is indicated as Φ (m), the hardness E×t$^3$ (Pa·m$^3$) of the membrane-like member 30 is preferably $21.6 \times d^{-1.25} \times \Phi^{4.15}$ or less.

In a case where $a \times d^{-1.25} \times \Phi^{4.15}$ is expressed using a coefficient a regarding the condition of the hardness condition of the membrane-like member 30, it was found that the coefficient a is 11.1 or less, 8.4 or less, 7.4 or less, 6.3 or less, 5.0 or less, 4.2 or less, 3.2 or less, and the smaller the coefficient a, the more preferable.

The hardness E×t$^3$ (Pa·m$^3$) of the membrane-like member 30 is preferably $2.49 \times 10^{-7}$ or more, more preferably $7.03 \times 10^{-7}$ or more, even more preferably $4.98 \times 10^{-6}$ or more, still more preferably $1.11 \times 10^{-5}$ or more, particularly preferably $3.52 \times 10^{-5}$ or more, and most preferably $1.40 \times 10^{-4}$ or more.

By causing the hardness E×t$^3$ (Pa·m$^3$) of the membrane-like member 30 to be within the above range, it is possible to suitably excite the higher-order vibration mode in the soundproof structure 20. In this case, the sound absorption coefficient in the higher-order vibration mode can be made higher than that in the fundamental vibration mode. Here, the "hardness of the membrane-like member 30" is, for example, the hardness in a case where the membrane-like member 30 is attached to the support body 24 in a state of being simply placed on the support body 24, in a case where zero tension is applied, that is, without being stretched. In a case where the membrane-like member 30 is attached to the support body 24 while a tension is applied to the membrane-like member 30, the hardness of the membrane-like member 30 may be obtained by performing correction for tension on the Young's modulus E of the membrane-like member 30.

Figure 6:
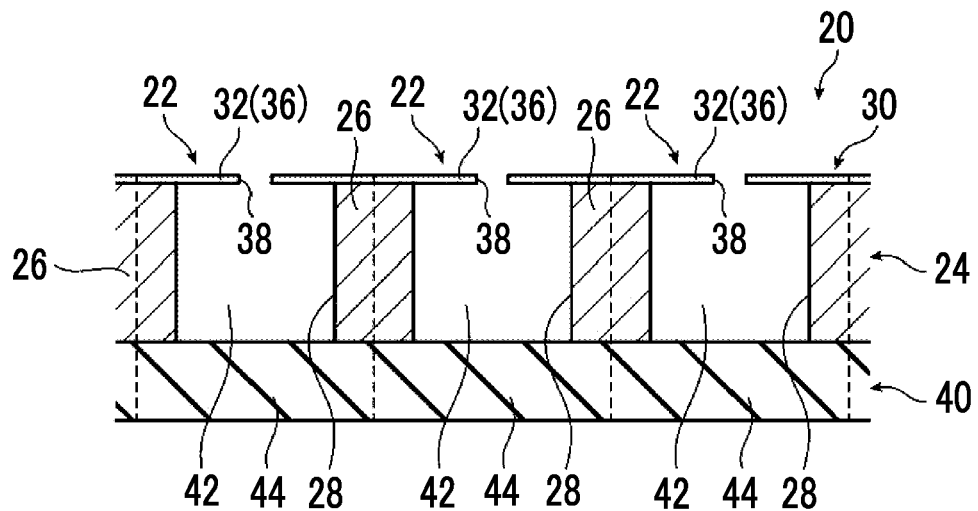
FIG. 6 is a view illustrating a modification example of the soundproof structure, and is a cross-sectional view illustrating a configuration in which a through-hole is formed in a membrane-like member.

In addition, although the rear surface space 42 is a closed space completely surrounded by the support body 24, the membrane-like member 30, and the rear surface plate 40, the rear surface space 42 is not limited thereto, and the space is substantially partitioned so that the air flow is blocked. Alternatively, an opening such as a hole or a cutout may be provided in at least one of the membrane-like member 30 or other members. Such a configuration is preferable because it is possible to avoid a situation in which the volume of the air in the rear surface space 42 is increased due to a temperature change and the like, a tension is applied to the membrane-like member 30, the hardness of the membrane-like member 30 is changed, and thus the sound absorption characteristics are changed. As a method of providing the opening, for example, a through-hole 38 is suitably formed in the vibratable part 36 of the membrane 32 (membrane-like member 30) in at least one of the plurality of membrane type resonating bodies 22, as illustrated in FIG. 6. FIG. 6 is a view illustrating a modification example of the soundproof structure 20, and is a cross-sectional view illustrating a configuration in which the through-hole 38 is formed in the membrane-like member 30.

By providing the through-hole 38, the frequency of a sound absorption peak (resonance frequency) can be changed. It is considered that this is because by providing the through-hole 38 in the membrane-like member 30, the acoustic impedance of the membrane-like member 30 changes, and the weight of the membrane-like member 30 decreases as the through-hole 38 is formed, resulting in a change in resonance frequency. The peak frequency can also be adjusted depending on the size of the through-hole 38.

The position where the through-hole 38 is provided is not particularly limited, and the through-hole 38 may be provided at the center position of the vibratable part 36 of the membrane-like member 30, or at a position in the vicinity of the fixed portion 34 fixed to the support body 24. The frequency of the sound absorption peak (resonance frequency) and the sound absorption coefficient change according to the position of the through-hole 38. The frequency of the sound absorption peak and the amount of change in the sound absorption coefficient are greater in a case where the through-hole 38 is provided at the center position of the vibratable part 36 of the membrane-like member 30 than in a case where the through-hole 38 is provided in the vicinity of the fixed portion 34.

Figure 7:
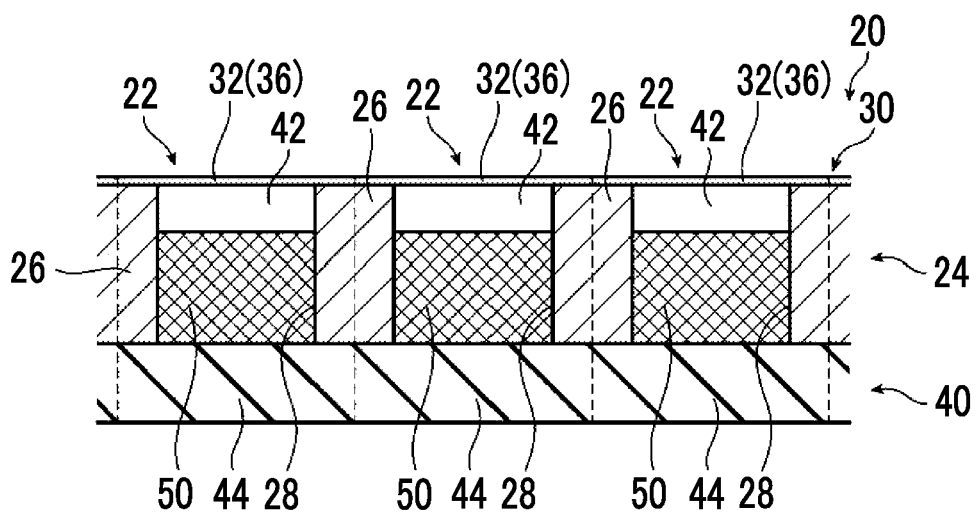
FIG. 7 is a view illustrating a modification example of the soundproof structure, and is a cross-sectional view illustrating a configuration in which a porous sound absorbing body is disposed in a rear surface space.

The soundproof structure 20 may further include the porous sound absorbing body 50 as illustrated in FIG. 7. The porous sound absorbing body 50 is disposed in the rear surface space 42 or at a position in contact with the membrane-like member 30, and in the example illustrated in FIG. 7, the porous sound absorbing body 50 is disposed in the rear surface space 24. By disposing the porous sound absorbing body 50 in the rear surface space 42 as described above, the peak sound absorption coefficient (sound absorption coefficient at a resonance frequency) is reduced, but the sound absorption range is widened on a low frequency side.

FIG. 7 is a view illustrating a modification example of the soundproof structure 20, and is a cross-sectional view illustrating a configuration in which the porous sound absorbing body 50 is disposed in the rear surface space 42.

In order to dispose the porous sound absorbing body 50 at a position in contact with the membrane-like member 30, for example, the porous sound absorbing body 50 may be disposed on the upper surface of the membrane-like member 30 (the surface opposite to the support body 24). According to the above configuration, a wide band sound absorption effect of the porous sound absorbing body 50 can be obtained, and the sound absorption and sound insulation effects having the peak by the membrane type soundproof structure 20 present on the rear surface thereof are obtained in the vicinity of the resonance frequency, so that both the effects can be achieved.

The porous sound absorbing body 50 is not particularly limited, and a known porous sound absorbing body can be appropriately used. For example, various known porous sound absorbing bodies including foam materials such as foamed urethane, soft urethane foam, wood, ceramic particle sintered materials, and phenolic foams, and materials containing fine air; fibers and non-woven fabric materials such as glass wool, rock wool, microfiber (Thinsulate manufactured by 3M or the like), floor mats, carpet, melt blown non-woven fabric, metal non-woven fabric, polyester non-woven fabric, metal wool, felt, insulation boards, and glass non-woven fabric; wood wool cement boards; nanofiber materials such as silica nanofiber; gypsum board; or laminated materials or composite materials thereof can be used.

The flow resistance $\sigma_1$ of the porous sound absorbing body 50 is not particularly limited, but is preferably 1000 to 100,000 (Pa·s/m$^2$), and more preferably 5000 to 80,000 (Pa·s/m$^2$), and even more preferably 10,000 to 50,000 (Pa·s/m$^2$). The flow resistance $\sigma_1$ of the porous sound absorbing body 50 can be evaluated by measuring a normal incidence sound absorption coefficient of a porous sound absorbing body having a thickness of 1 cm, and fitting the measured value by a Miki model (J. Acoust. Soc. Jpn., 11(1) pp. 19-24 (1990)). Alternatively, the flow resistance $\sigma_1$ of the porous sound absorbing body 50 may be evaluated according to "ISO 9053".

Furthermore, in the soundproof structure 20 (specifically, each of the plurality of membrane type resonating bodies 22), the combination of the membrane-like member 30 and the support body 24 (that is, the membrane 32 and the layer of the frame 26) may be provided only in one set as illustrated in FIG. 2, or may be provided in a state of overlapping a plurality of sets (that is, a configuration in which the plurality of rear surface spaces 42 may be overlapped in the thickness direction of the soundproof structure 20 may be adopted).

In the present invention, the soundproof structure 20 can absorb a sound by the above resonance structure, and can insulate a sound having a frequency higher than a relative maximum resonance frequency at which the sound absorption coefficient becomes a relative maximum among the resonance frequencies of the resonance structure. Therefore, the relative maximum resonance frequency is set to be lower than a sound insulation target frequency set for noise. More specifically, the resonance frequency of at least the fundamental vibration mode or one higher-order vibration mode of the membrane 32 (membrane-like member 30) of each membrane type resonating body 22 is set to be lower than the sound insulation target frequency. Here, the "resonance frequency of the higher-order vibration mode" means a resonance frequency whose sound absorption coefficient is higher than that at the resonance frequency of the fundamental vibration mode.

Furthermore, regarding the soundproofing performance of the soundproof structure 20, in a case where the sound insulation target frequency is indicated as fn and the relative maximum resonance frequency is indicated as fr, fn/fr is 1.05 to 1.50. Accordingly, the soundproof structure 20 can efficiently insulate noise with a lightweight configuration. That is, according to the present invention, it is possible to achieve a relatively large higher-order vibration frequency on the high frequency side by the membrane type resonance structure in which the thickness of the rear surface space 42 is small, and to directly insulate an air propagation sound (noise) using highly efficient high-frequency resonance characteristics.

More specifically, as described in "SUMMARY OF THE INVENTION", there is a situation where sound insulation properties are required rather than sound absorption as the performance of a soundproof structure, and for example, sound insulation properties are important in a space that is insulated from a noise source by a partition member such as a wall or a partition material with no gap. In such a situation, there is concern that a sufficient soundproofing effect may not be obtained even if the resonance structure described in JP2016-170194A in which noise is reduced by sound absorption is used.

Figure 8:
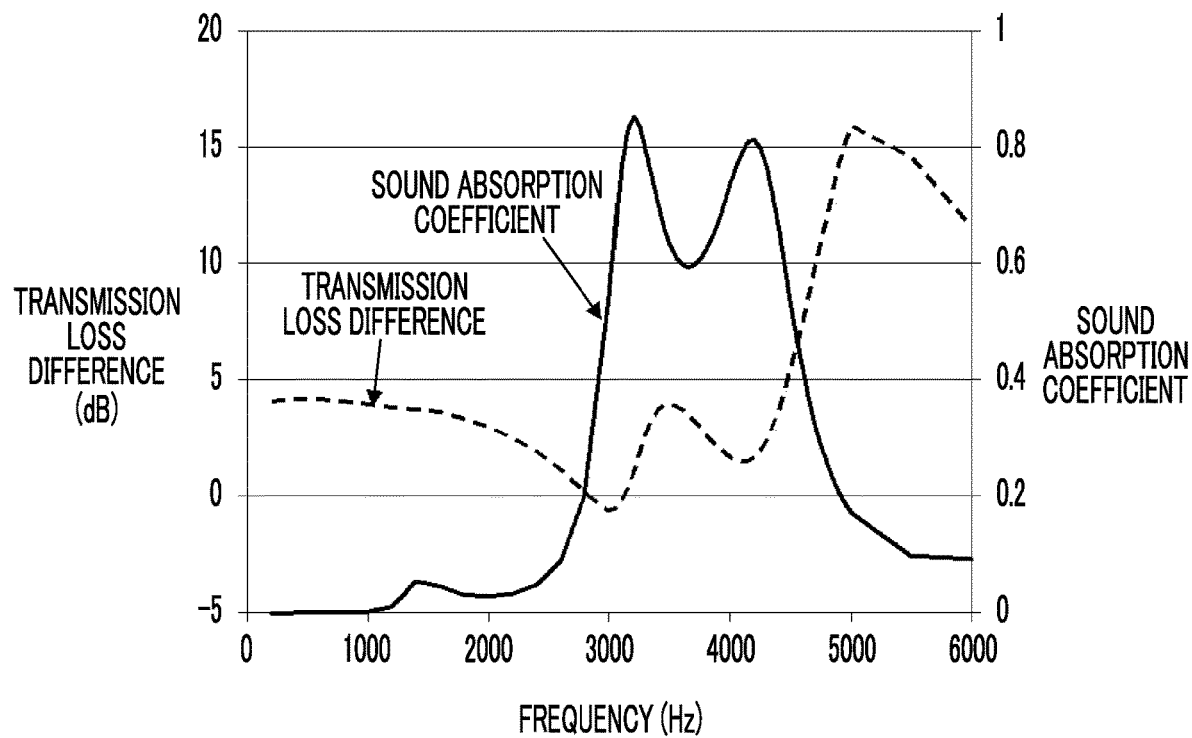
FIG. 8 is a diagram showing a sound absorption coefficient and a transmission loss difference of a membrane type resonating body according to the present invention.

On the other hand, a soundproof structure adopting a general resonance structure is considered to be able to selectively silence a sound at its resonance frequency (strictly speaking, a relative maximum resonance frequency) and is used in a state where the resonance frequency is matched to a specific frequency of noise (hereinafter, also referred to as a specific frequency). Here, in a case where the membrane type resonating body 22 illustrated in FIG. 2 is used, as illustrated in FIG. 8, the sound absorption coefficient becomes a relative maximum at each of the resonance frequency of the fundamental vibration mode (1300 Hz) and the resonance frequencies of the higher-order vibration mode (about 3 kHz and about 4 kHz). Further, in the higher-order vibration mode, the sound absorption coefficient becomes higher than in the fundamental vibration mode, and two large peaks appear in the case illustrated in FIG. 8. FIG. 8 is a diagram showing a sound absorption coefficient and a transmission loss difference of the membrane type resonating body 22. In addition, in the graphs shown in FIG. 8, the graph showing the transmission loss difference shows the difference between the transmission loss in a case where the membrane type resonating body 22 (that is, the configuration in which the membrane 32 and the plate body 44 are fixed to the frame 26) is used, and the transmission loss in a case where only the plate body 44 (an acrylic plate having a thickness of 2 mm) is used.

Figure 9:
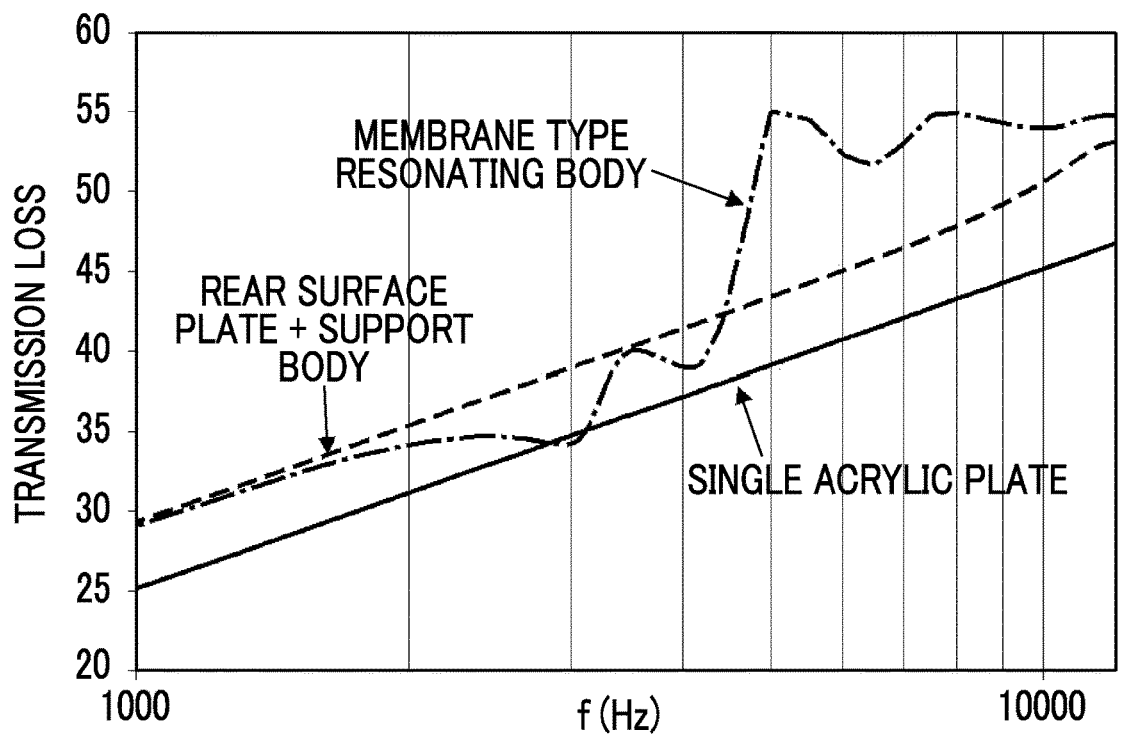
FIG. 9 is a diagram showing a transmission loss of the membrane type resonating body according to the present invention.

However, according to the examination by the present inventors, it was found that in a case where the resonance frequency is matched to a specific frequency in order to insulate noise using the above-mentioned membrane type resonating body 22, as shown in FIGS. 8 and 9, the transmission loss was rather small in the vicinity of the resonance frequency. Specifically, as shown in FIG. 9, it was found that in the vicinity of the resonance frequency of the higher-order vibration mode (about 3 kHz and 4 kHz), the transmission loss in a case of using the above-mentioned membrane type resonating body 22 is smaller than the transmission loss in a case of using only the plate body 44. FIG. 9 is a diagram showing the transmission loss of the membrane type resonating body 22. In the figure, as a comparative example, the transmission loss in a case of using a structure in which the membrane 32 is excluded from the membrane type resonating body 22 (that is, a structure in which only the plate body 44 is fixed to the frame 26) and the transmission loss in a case of using only the plate body 44 (an acrylic plate having a thickness of 2 mm) are also shown.

On the other hand, it was found that the transmission loss shows a large peak in a frequency band exceeding the resonance frequency, as shown in FIGS. 8 and 9. That is, it became clear that in the membrane type resonating body 22, the transmission loss of the air propagation sound in the plate body 44 (the rear surface plate 40) becomes small in the vicinity of the resonance frequency, but in a frequency band on the higher frequency side (strictly speaking, a band close to the resonance frequency), the transmission loss rises to the peak (relative maximum value). That is, according to the configuration of the membrane type resonating body 22, at a frequency higher than the resonance frequency, higher sound insulation properties than the sound insulation properties obtained by the weight of a normal plate (that is, the sound insulation effect according to the mass law) are obtained. Therefore, while sound insulation properties are usually improved by increasing the weight of the plate body 44, in the soundproof structure 20 of the present invention (specifically, the membrane type resonating body 22 forming the soundproof structure 20), it is possible to obtain large sound insulation properties only by fixing the membrane 32 which is relatively thin to the frame 26 without particularly increasing the volume and the mass.

In addition, in a case where noise having a specific frequency or noise having a narrow frequency band is insulated according to the mass law that is the mechanism of a normal sound insulation material, the sound pressure decreases overall, but a state where the noise at the specific frequency is significantly higher than sounds of surrounding frequencies remains unchanged. For this reason, even if the sound insulation material is applied, the noise at the specific frequency is still stronger than the noise at the surrounding frequencies, and therefore the state where the noise at the specific frequency is heard remains unchanged. On the other hand, in the soundproof structure 20 of the present invention, as shown in FIGS. 8 and 9, since the transmission loss has a peak at a frequency higher than the resonance frequency, noise having a frequency in the vicinity of the peak can be selectively insulated. As a result, it is possible to eliminate the state where the noise to be insulated is relatively louder than the sounds of the surrounding frequencies, so that it is possible to effectively suppress the state where the noise having the specific frequency is harsh to the ear.

FIG. 8 and FIG. 9 show simulation results in a case where a plane wave sound is incident on the membrane type resonating body 22 from the membrane 32 side. The simulation is performed using the finite element method calculation software COMSOL ver. 5.3a (COMSOL Inc.), and the calculation condition is the same as the condition of Simulation 1, which will be described later. As the membrane 32, a polyethylene terephthalate (PET) film having a Young's modulus of 4.5 GPa and a density of 1.4 g/cm$^3$ was postulated, and the thickness thereof was set to 50 The frame 26 was an acrylic cylinder, and the diameter of the opening (in other words, the diameter of the vibratable part 36 of the membrane 32) thereof was set to 20 mm. The plate body 44 was an acrylic plate having a thickness of 2 mm, and the thickness of the rear surface space 42 was set to 3 mm.

The mechanism of the sound insulation behavior described above will be described. In a case where noise is incident on the membrane 32 (the membrane-like member 30) in the membrane type resonating body 22 and the membrane 32 vibrates, the air in the rear surface space 42 undergoes elastic deformation (adiabatic compression and adiabatic expansion) due to the vibration, and the sound pressure in the rear surface space 42 changes accordingly. In a case where the membrane 32 vibrates, the vibration propagates from a part of the frame 26 (support body 24) fixed to the membrane 32 to a part thereof fixed to the plate body 44 (rear surface plate 40), so that the frame 26 itself vibrates. At this time, at the resonance frequency, both the vibration of the frame 26 and the sound pressure in the rear surface space 42 become large, and as a result, the plate body 44 (rear surface plate 40) is shaken, which causes a sound to escape (be transmitted). On the contrary, in a frequency band higher than the resonance frequency, the phase of the vibration of the membrane 32 and the shaking phase of the plate body 44 are in antiphase, so that the sound shaking the plate body 44 (rear surface plate 40) is canceled out, resulting in an increase in the transmission loss.

On the basis of the sound insulation behavior as described above, in the present invention, the sound insulation properties can be enhanced by intentionally setting the resonance frequency (strictly speaking, the relative maximum resonance frequency) that is usually matched to the specific frequency of noise to a low frequency side. As a result, the partition member 10 provided with the soundproof structure 20 effectively insulate high frequency noise (particularly single frequency sounds such as motor operating noise or inverter switching noise) without particularly increasing the volume and weight thereof.

As a resonance structure that cancels out noise at a frequency higher than the resonance frequency, the resonance structure body of JP1998-205351A (JP-H10-205351A) can be adopted. In the resonance structure body, in order to resonate (vibrate) the vibrating body, the noise generating vibrating body is connected to the vibrating body via the rigid body such as the connecting mechanism. However, the resonance structure body is not suitable in a case where a sound source is far from the vibrating body and a case where it is difficult to provide connection to a source of noise such as road noise or wind noise of a car.

On the other hand, in the resonance structure (that is, the structure of the membrane type resonating body 22) adopted by the soundproof structure 20 of the present invention, the noise propagating in the air is directly incident on the surface of the membrane-like member 30, and the membrane-like member 30 resonates (vibrates). Therefore, it is not necessary to particularly provide connection between the membrane-like member 30 and the sound source. Therefore, in the soundproof structure 20 of the present invention, it is not necessary to provide a connecting mechanism or the like for transmitting vibration.

Furthermore, in the resonance structure body disclosed in JP1998-205351A (JP-H10-205351A), in a case where the resonance frequency largely deviates from the frequency of the sound to be silenced, the silencing effect tends to be reduced. Therefore, the resonance frequency also needs to be set to a high frequency. However, in a case where high frequency resonance is generated, the resonance efficiency may decrease depending on the vibration mode of the vibrating body (for example, in the fundamental vibration).

On the other hand, in the resonance structure adopted by the soundproof structure 20 of the present invention, by setting fn/fr, which is the ratio of the frequency of the sound absorption peak (relative maximum resonance frequency) to the sound insulation target frequency, to a suitable range, it is possible to effectively insulate noise.

Figure 10:
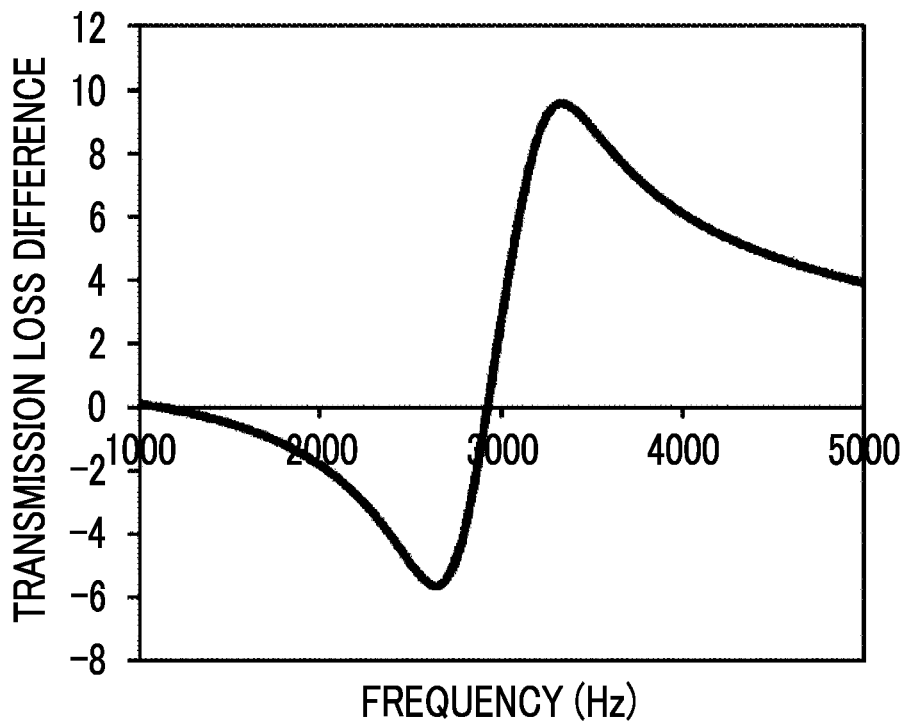
FIG. 10 is a diagram showing a simulation result of a transmission loss difference in a case where the thickness of a membrane is 250 µm.
Figure 11:
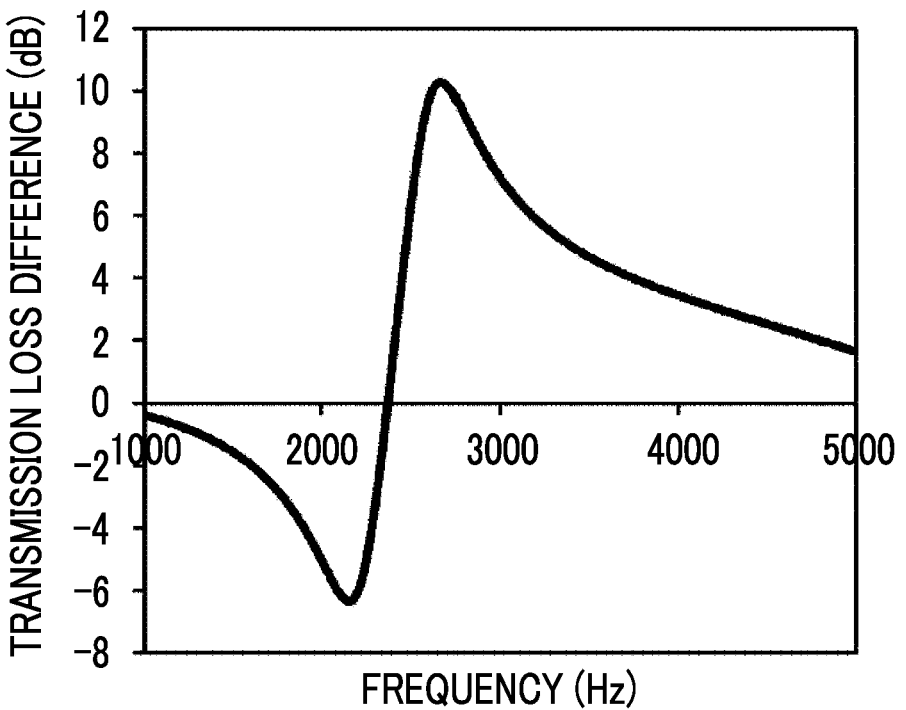
FIG. 11 is a diagram showing a simulation result of a transmission loss difference in a case where the thickness of the membrane is 180 µm.

More specifically, as shown in FIGS. 10 and 11, the transmission loss difference becomes a relative minimum at the resonance frequency, and the transmission loss difference becomes a relative maximum on the high frequency side of the resonance frequency. In FIGS. 10 and 11, the transmission loss difference is the difference between the transmission loss in a case of using the membrane type resonating body 22, and the transmission loss in a case of using the structure in which only the plate body 44 is fixed to the frame 26 (the structure in which the membrane 32 is not attached). FIGS. 10 and 11 are diagrams showing simulation results of the transmission loss difference in a case where the thickness of the membrane 32 is 250 μm and 180 μm. The simulations in which the results shown in FIGS. 10 and 11 were obtained were performed under the same conditions as those in the case of FIGS. 8 to 10 described above, except for the thickness of the membrane 32.

Figure 12:
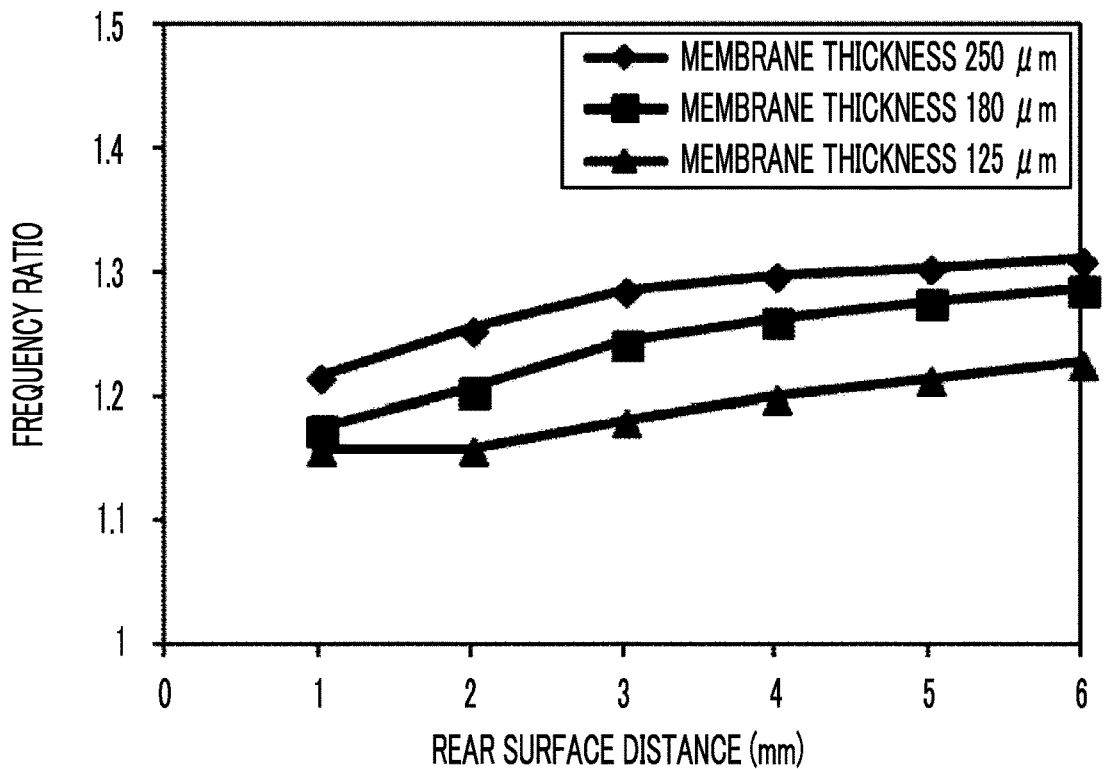
FIG. 12 is a diagram showing a frequency ratio (fn/fr) in a case where the thickness of a rear surface plate is 2 mm.
Figure 13:
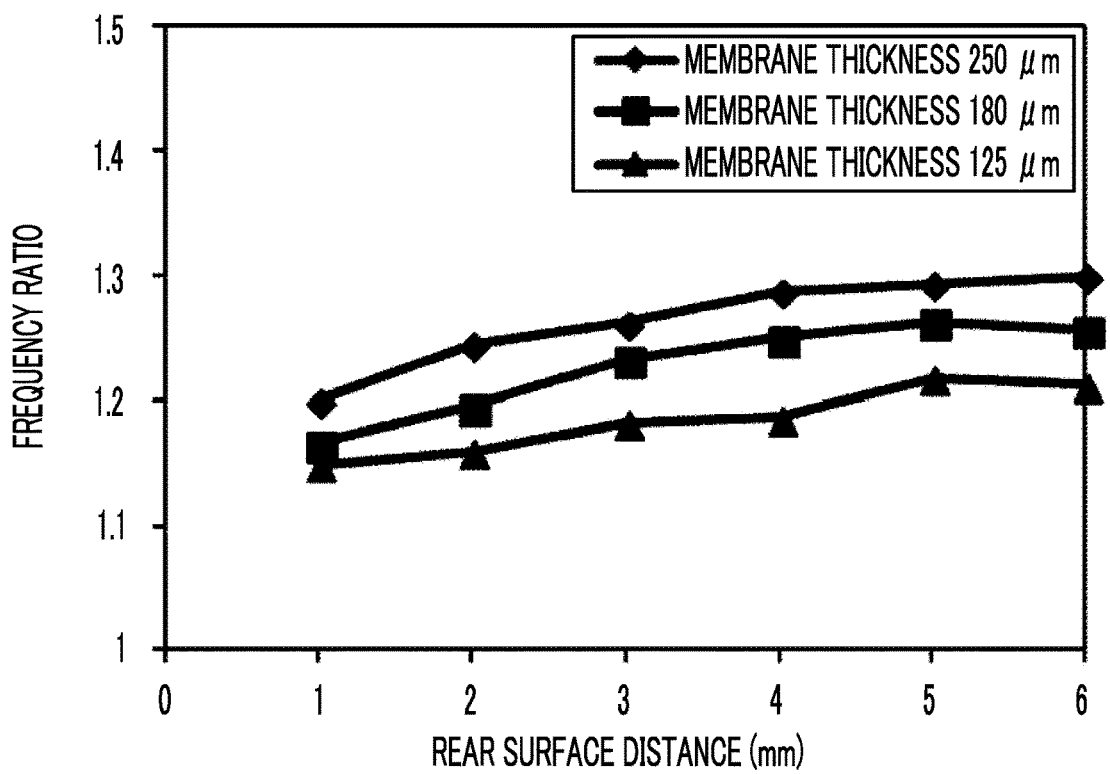
FIG. 13 is a diagram showing a frequency ratio (fn/fr) in a case where the thickness of the rear surface plate is 1 mm.

Furthermore, as shown in FIGS. 12 and 13, in a case where the thicknesses of the membrane 32, the plate body 44, and the rear surface space 42 change, the resonance frequency itself changes, but the ratio of the frequency at which the transmission loss difference becomes a relative maximum to the frequency at which the transmission loss difference becomes a relative minimum (hereinafter referred to as the frequency ratio) is in a range of 1.1 to 1.4. Strictly speaking, the frequency ratio in a case where the thickness of the plate body 44 (rear surface plate 40) is 2 mm is in a range of 1.15 to 1.32 as shown in FIG. 12. The frequency ratio in a case where the thickness of the plate body 44 (rear surface plate 40) is 1 mm is in a range of 1.14 to 1.31 as shown in FIG. 13.

FIGS. 12 and 13 are diagrams showing frequency ratios in a case where the thickness of the membrane 32 is set to 125 μm, 180 μm, and 250 μm, and the thickness of the rear surface space 42 is changed in a range of 1 to 6 mm in increments of 1 mm. FIG. 12 shows the frequency ratio in a case where the thickness of the plate body 44 is 2 mm, and FIG. 13 shows the frequency ratio in a case where the thickness of the plate body 44 is 1 mm. Here, the frequency ratio is obtained from the following formula by performing the same simulation as in the case of FIGS. 10 and 11 and calculating the frequency at which the transmission loss difference becomes a relative maximum and the frequency at which the transmission loss difference becomes a relative minimum.

Frequency ratio=(frequency at which transmission loss difference becomes relative maximum)/ (frequency at which transmission loss difference becomes relative minimum)

Figure 14:
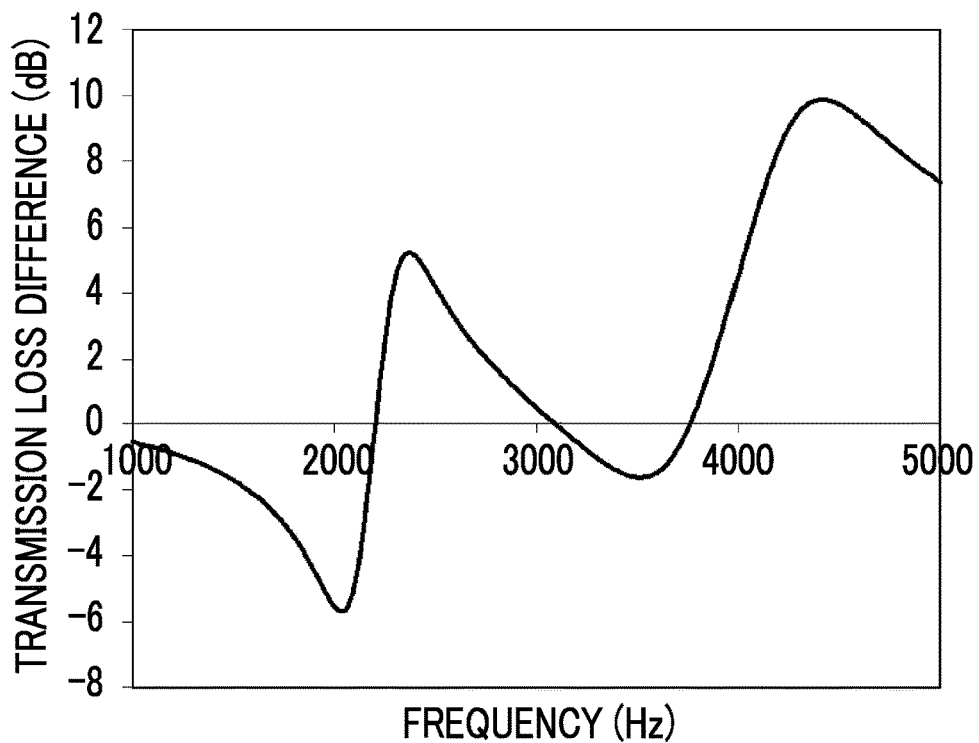
FIG. 14 is a diagram showing a simulation result of a transmission loss difference in a case where the thickness of the membrane-like member is 100 µm.

Furthermore, as shown in FIG. 14, the frequency at which the transmission loss difference becomes a relative maximum and the frequency at which the transmission loss difference becomes a relative minimum are respectively present in a fundamental vibration mode and a higher-order vibration mode. That is, as shown in FIG. 14, from the low frequency side, the frequency at which the transmission loss difference becomes a relative minimum in the fundamental vibration mode, the frequency at which the transmission loss difference becomes a relative maximum in the fundamental vibration mode, the frequency at which the transmission loss difference becomes a relative minimum in the higher-order vibration mode, and the frequency at which the transmission loss difference becomes a relative maximum in the higher-order vibration mode appear in this order. FIG. 14 is a diagram showing a simulation result of a transmission loss difference in a case where the thickness of the membrane 32 is 100 μm. The simulation in which the results shown in FIG. 14 were obtained was performed under the same conditions as those in the case of FIGS. 10 and 11 described above, except for the thickness of the membrane 32.

Figure 15:
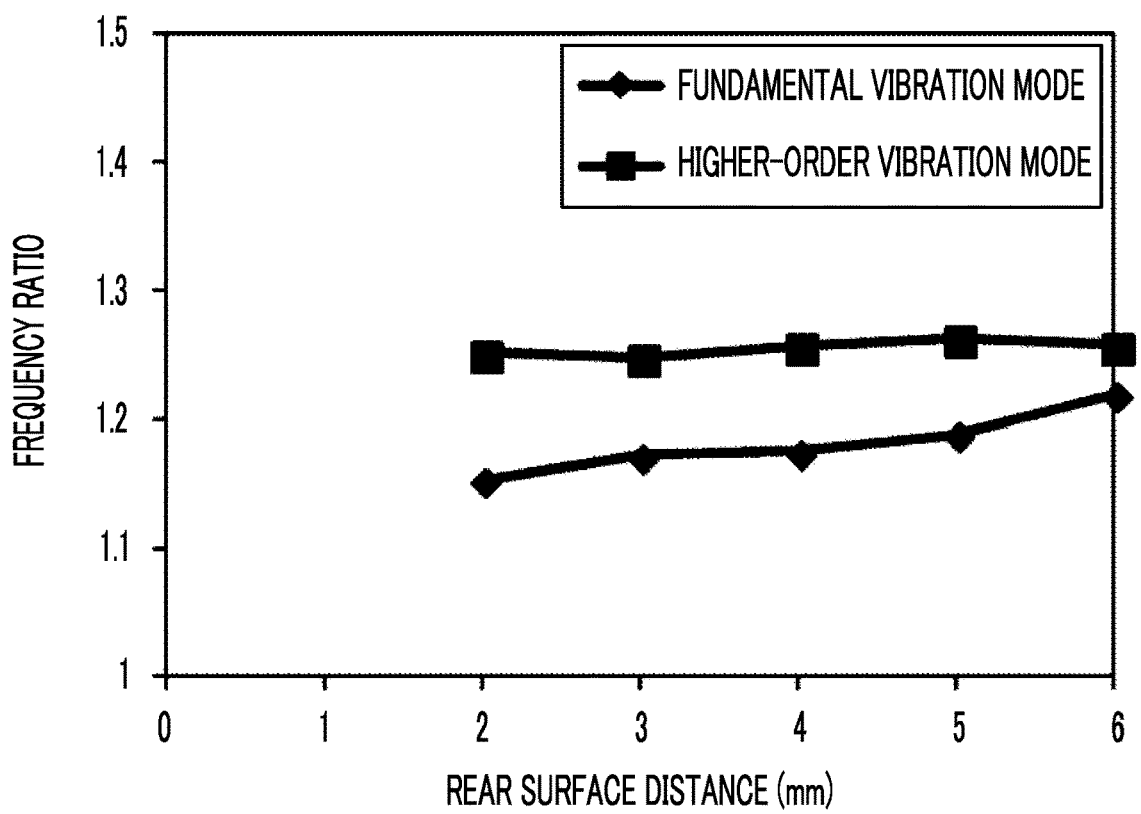
FIG. 15 is a diagram showing a frequency ratio (fn/fr) in a case where the thickness of the membrane-like member is 100 µm.
Figure 16:
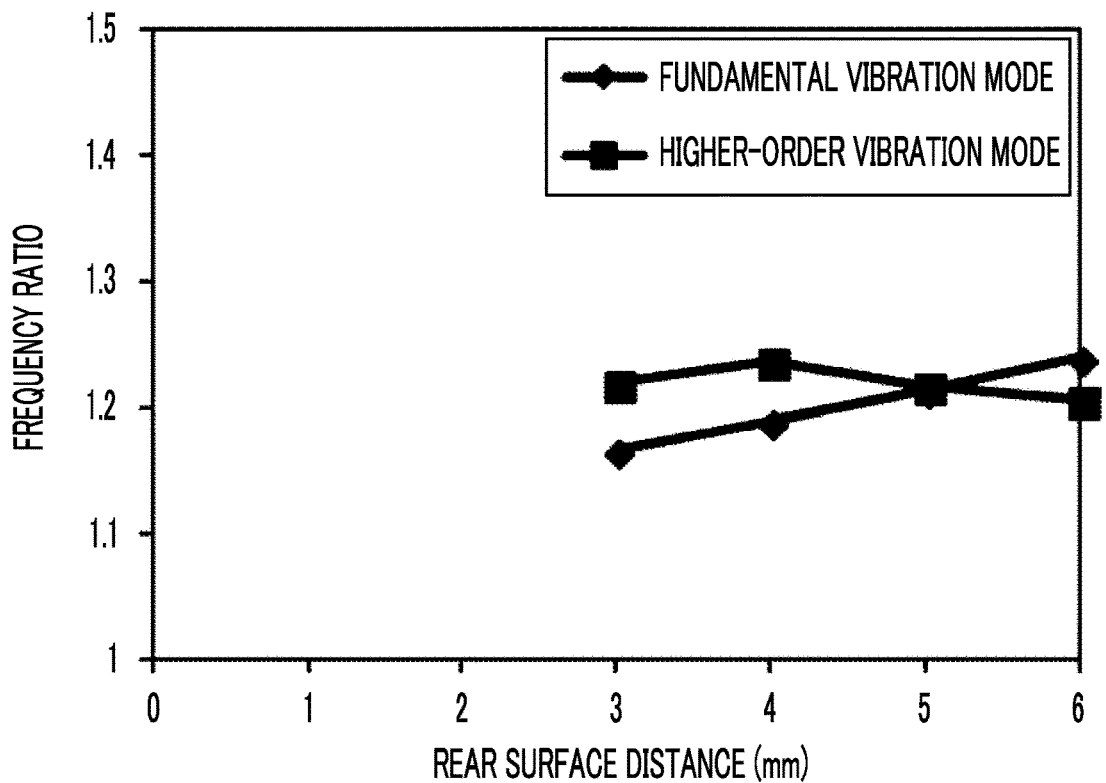
FIG. 16 is a diagram showing a frequency ratio (fn/fr) in a case where the thickness of the membrane-like member is 50 mm.

Furthermore, as shown in FIGS. 15 and 16, the frequency ratio of each of the fundamental vibration mode and the higher-order vibration mode (the ratio of the frequency at which the transmission loss difference becomes a relative maximum and the frequency at which the transmission loss difference becomes a relative minimum) slightly changes in a case where the thickness of the membrane 32 is changed, but is in the range of 1.1 to 1.4. Strictly speaking, the frequency ratio of each vibration mode in a case where the thickness of the membrane 32 is 100 μm is in a range of 1.15 to 1.27 as shown in FIG. 15. The frequency ratio in a case where the thickness of the membrane 32 is 50 μm is in a range of 1.16 to 1.24 as shown in FIG. 16.

FIGS. 15 and 16 are diagrams showing the frequency ratio of each vibration mode in a case where the thickness of the rear surface space 42 is changed in a range of 2 to 6 mm (or 3 to 6 mm) in increments of 1 mm. FIG. 15 shows the frequency ratio in a case where the thickness of the membrane 32 is 100 μm, and FIG. 16 shows the frequency ratio in a case where the thickness of the membrane 32 is 50 mm. The frequency ratio of each vibration mode is obtained from the following formula by performing the same simulation as in the case of FIGS. 10 and 11 and calculating the frequency at which the transmission loss difference becomes a relative maximum and the frequency at which the transmission loss difference becomes a relative minimum for each of the fundamental vibration mode and the higher-order vibration mode.

Frequency ratio of fundamental vibration mode=(frequency at which transmission loss difference becomes relative maximum in fundamental vibration mode)/ (frequency at which transmission loss difference becomes relative minimum in fundamental vibration mode)

Frequency ratio of higher-order vibration mode=(frequency at which transmission loss difference becomes relative maximum in higher-order vibration mode)/ (frequency at which transmission loss difference becomes relative minimum in higher-order vibration mode)

From the above results, it was found that in a case where the frequency at which the transmission loss becomes a relative minimum, that is, the resonance frequency of the membrane type resonating body 22 is determined, the transmission loss becomes a relative maximum at a frequency in a range of 1.05 to 1.50 times the resonance frequency (in other words, sufficient sound insulation properties are obtained). Based on this, in the present invention, the resonance frequency of the membrane type resonating body 22 is set to an appropriate value with respect to the specific frequency of noise, that is, the sound insulation target frequency. Specifically, considering that fn/fr, which the ratio of the relative maximum resonance frequency to the sound insulation target frequency, is 1.05 to 1.50, the resonance frequency is set to a lower frequency side than the sound insulation target frequency. Accordingly, the frequency at which the transmission loss becomes a relative maximum matches the sound insulation target frequency, so that it is possible to effectively insulate the sound of the sound insulation target frequency.

In a case where the membrane 32 (the membrane-like member 30) vibrates in the higher-order vibration mode, the resonance frequency in the higher-order vibration mode is set to an appropriate value in a lower frequency band than the sound insulation target frequency. Accordingly, the frequency at which the transmission loss becomes a maximum in the higher-order vibration mode matches the sound insulation target frequency, so that it is possible to effectively insulate the sound of the sound insulation target frequency.

In addition, fn/fr is preferably in a range of 1.08 to 1.40, and more preferably in a range of 1.10 to 1.35.

EXAMPLES

[Simulation 1]

The soundproofing performance of the resonance structure of the soundproof structure of the present invention was examined by a simulation using the finite element method calculation software COMSOL ver. 5.3a (COMSOL Inc.).

A calculation model used for the simulation was a two-dimensional axisymmetric structure calculation model, and the simulation was performed on the resonance structure of the soundproof structure of the present invention, that is, a structure in which a membrane-like member was fixed to one end of a support body with an opening formed therein and a rear surface plate was fixed to the opposite side. As the membrane-like member, a polyethylene terephthalate (PET) film having a Young's modulus of 4.5 GPa and a density of 1.4 g/cm$^3$ was postulated, and the thickness thereof was set to 50 μm. The support body was an acrylic cylinder, and the diameter of the opening (in other words, the diameter of a vibratable part of the membrane-like member) thereof was set to 20 mm. The rear surface plate was an acrylic plate having a thickness of 2 mm, and thickness of the rear surface space was set to 3 mm.

In the simulation, the transmittance, the reflectance, and the sound absorption coefficient were calculated in a case where a plane wave sound was incident from the membrane surface (surface of the membrane-like member) side of the resonance structure. The sound absorption coefficient was calculated in a normal incidence sound absorption coefficient arrangement, and each relative maximum value and the frequency at that time were calculated.

Figure 17:
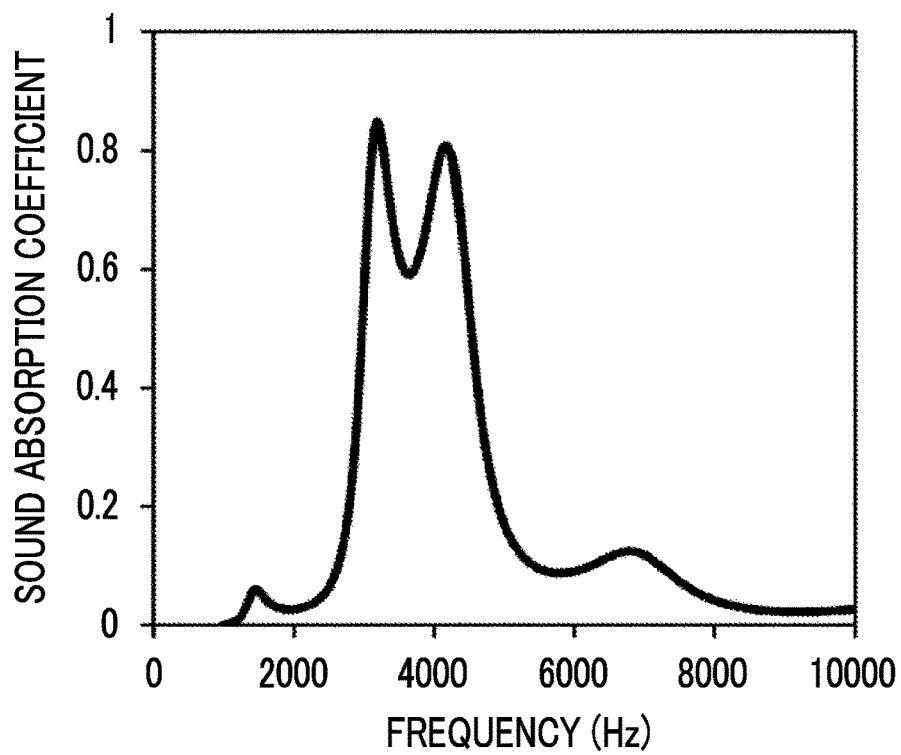
FIG. 17 is a diagram showing a calculation result in a case where a sound absorption coefficient in a case where a sound is incident in a plane wave form from a membrane surface side of a resonance structure is simulated.

FIG. 17 shows a calculation result in a case where the sound absorption coefficient in a case where a sound is incident in a plane wave form from the membrane surface side of the resonance structure is simulated. As shown in FIG. 17, the sound absorption coefficient becomes a relative maximum at each of a resonance frequency of the fundamental vibration mode (about 1300 Hz) and the resonance frequencies of a higher-order vibration mode (about 3 kHz and about 4 kHz). In the higher-order vibration mode, the sound absorption coefficient becomes higher than in the fundamental vibration mode, and two large peaks appear as shown in FIG. 17.

Figure 18:
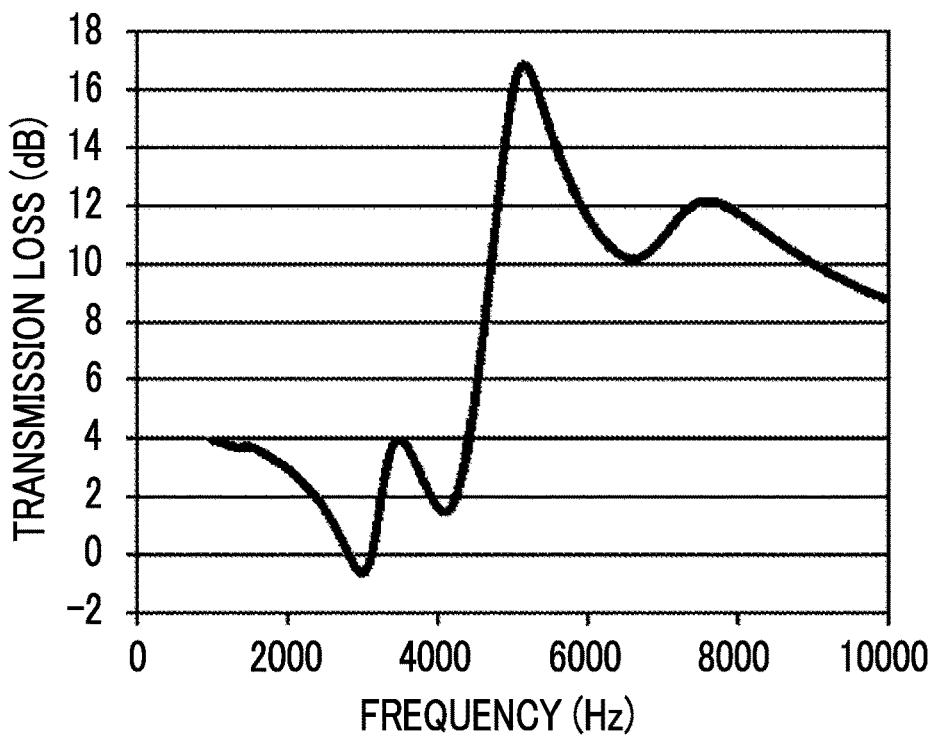
FIG. 18 is a diagram showing a calculation result in a case where a transmission loss in a case where a sound is incident in a plane wave form from the membrane surface side of the resonance structure is simulated (first).

FIG. 18 shows a calculation result in a case where a transmission loss in a case where a sound is incident in a plane wave form from the membrane surface side of the resonance structure is simulated. The vertical axis of FIG. 18 represents the difference between the transmission loss in a case of using the above resonance structure and the transmission loss in a case of using a single acrylic plate having a thickness of 2 mm. That is, it becomes clear from FIG. 18 how much the transmission loss becomes larger in a case where the resonance structure (membrane type resonance structure) is attached to the rear surface plate than in a case where a single plate (acrylic plate) having the same thickness is used.

In a case where the above resonance structure is used, as can be seen from FIG. 18, it was found that even though the membrane type resonance structure is formed, the transmission loss becomes smaller than zero in the vicinity of the resonance frequency of the higher-order vibration mode (that is, the transmittance of a sound passing through the rear surface plate is increased).

Figure 19:
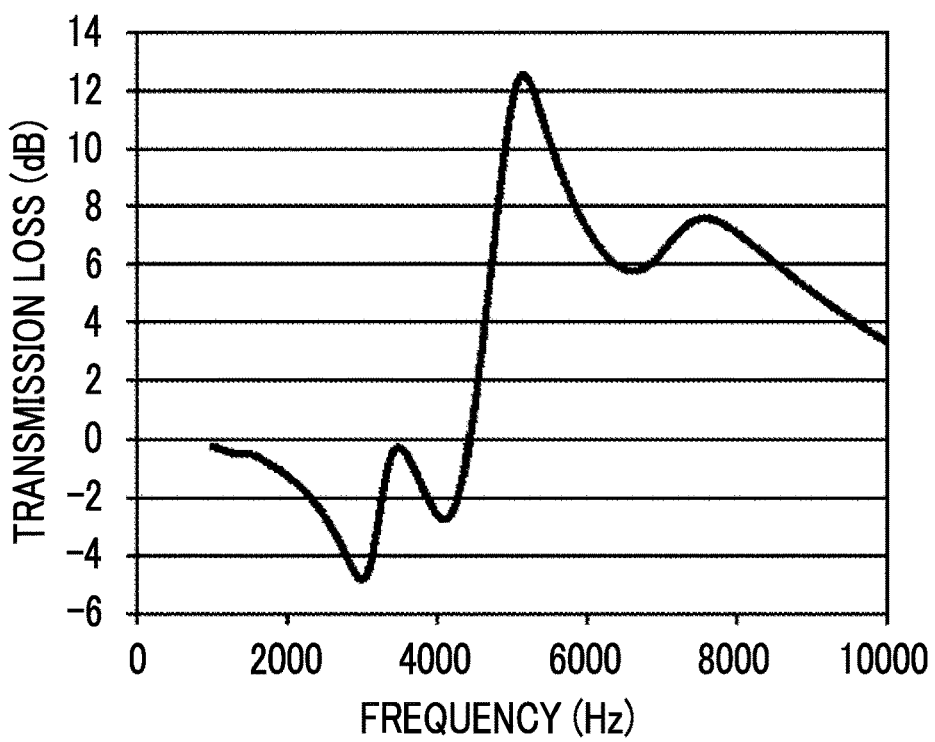
FIG. 19 is a diagram showing a calculation result in a case where a transmission loss in a case where a sound is incident in a plane wave form from the membrane surface side of the resonance structure is simulated (second).

FIG. 19 shows a calculation result in a case where a transmission loss in a case where a sound is incident in a plane wave form from the membrane surface side of the resonance structure is simulated. The vertical axis of FIG. 19 represents the difference between the transmission loss when using the above resonance structure and the transmission loss when using a structure excluding only the membrane-like member from the resonance structure (that is, a structure including only the rear surface plate and the support body). As shown in FIG. 19, the transmission loss becomes larger in a case where a frame (support body) is attached to the plate than in a case of using a single plate body. On the other hand, it was found that in a case where the membrane-like member is further attached, the transmission loss becomes small in the vicinity of the resonance frequency exhibiting a high sound absorption coefficient, and the transmission loss has a large peak on the high frequency side above the resonance frequency. That is, according to the resonance structure of the soundproof structure of the present invention, it became clear that the transmission loss of an air propagation sound becomes smaller in the vicinity of the resonance frequency, but in a frequency band on the higher frequency side (particularly, a band near the resonance frequency), the transmission loss increases and reaches the peak. That is, according to the resonance structure in which the membrane-like member and the rear surface plate are fixed to the support body, larger sound insulation properties can be obtained for noise having a higher frequency than the resonance frequency than sound insulation properties achieved by the weight of a normal plate (that is, sound insulation properties according to the mass law). Therefore, while sound insulation properties are usually enhanced by increasing the weight of a plate, in a case where the resonance configuration described above is used, large sound insulation properties can be obtained only by fixing the membrane-like member having a small thickness and a small mass (in Simulation 1, the membrane-like member having a thickness of 50 μm) to the support body without particularly increasing the volume and the mass of the structure.

Example 1

<Production of Soundproof Structure>

As a membrane-like member, a PET film (Lumirror manufactured by Toray Industries, Inc.) having a thickness of 50 μm was prepared and cut into a circular shape having a diameter of 60 mm.

An acrylic plate (manufactured by Hikari Co., Ltd.) having a thickness of 3 mm was prepared and cut into a disc having a diameter of 60 mm using a laser cutter, and an opening having a square shape of 20 mm on a side was formed in the center portion thereof to produce a ring-shaped plate (hereinafter, doughnut-shaped member). This doughnut-shaped member was used as a support body. Then, one surface of the produced doughnut-shaped member and the circular PET film were overlapped so that the outer edges of the two were coincident with each other, and the two were bonded using a double-sided tape (Genba no Chikara ASKUL Corporation).

A circular acrylic plate (rear surface plate) having a thickness of 2 mm and a diameter of 60 mm was attached to the other surface of the doughnut-shaped member with a double-sided tape.

By the above procedure, a soundproof structure having a drum-shaped vibrating membrane structure (membrane type resonance structure) was produced. The rear surface space of the soundproof structure is a closed space and has a thickness of 3 mm.

<Evaluation>

Acoustic tube measurement was performed with the produced soundproof structure disposed such that a sound was incident from the membrane surface (membrane-like member) side. Specifically, according to "ASTM E2611-09: Standard Test Method for Measurement of Normal Incidence Sound Transmission of Acoustical Materials Based on the Transfer Matrix Method", a transmittance and reflectance measurement system using a 4-terminal microphone (not illustrated) was prepared and evaluation was performed. The internal diameter of the acoustic tube was set to 40 mm. In addition, WinZacMTX manufactured by Nihon Onkyo Engineering Co., Ltd. can be used for the same measurement.

Furthermore, by the same acoustic tube measurement as described above, the transmittance and the reflectance were measured for a single acrylic plate having a thickness of 2 mm and a diameter of 60 mm.

Thereafter, the transmission loss was obtained from the transmittance obtained in each measurement, and the absorption coefficient (sound absorption coefficient) of the sound, which was (1-transmittance-reflectance), was obtained.

Figure 20:
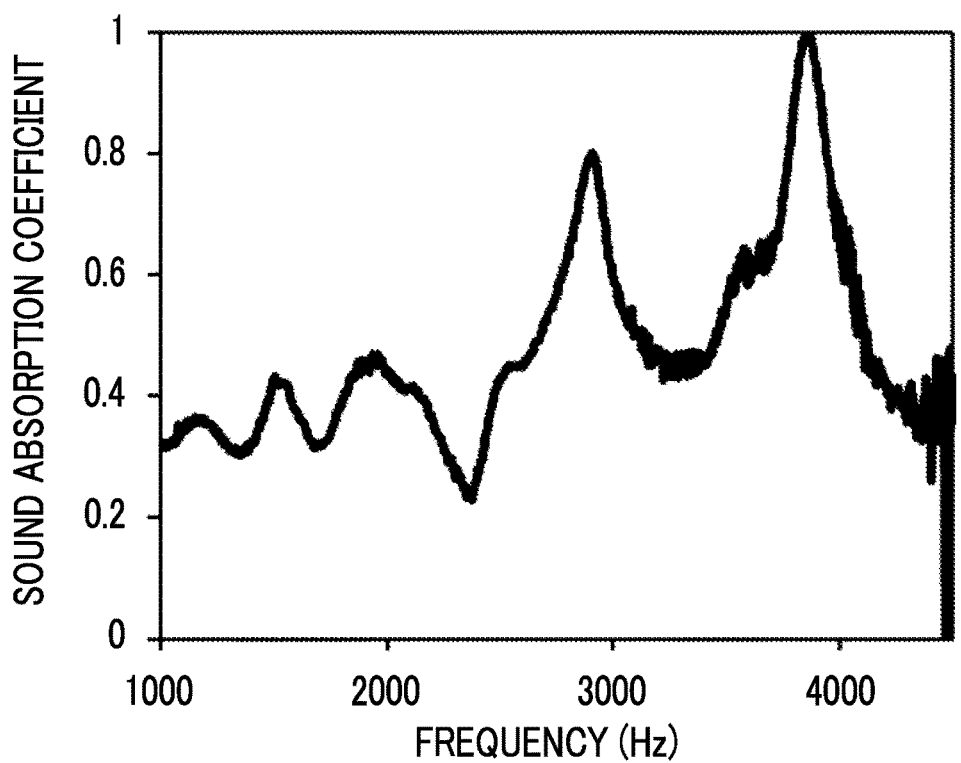
FIG. 20 is a diagram showing a sound absorption coefficient obtained for a soundproof structure produced in Example 1.
Figure 21:
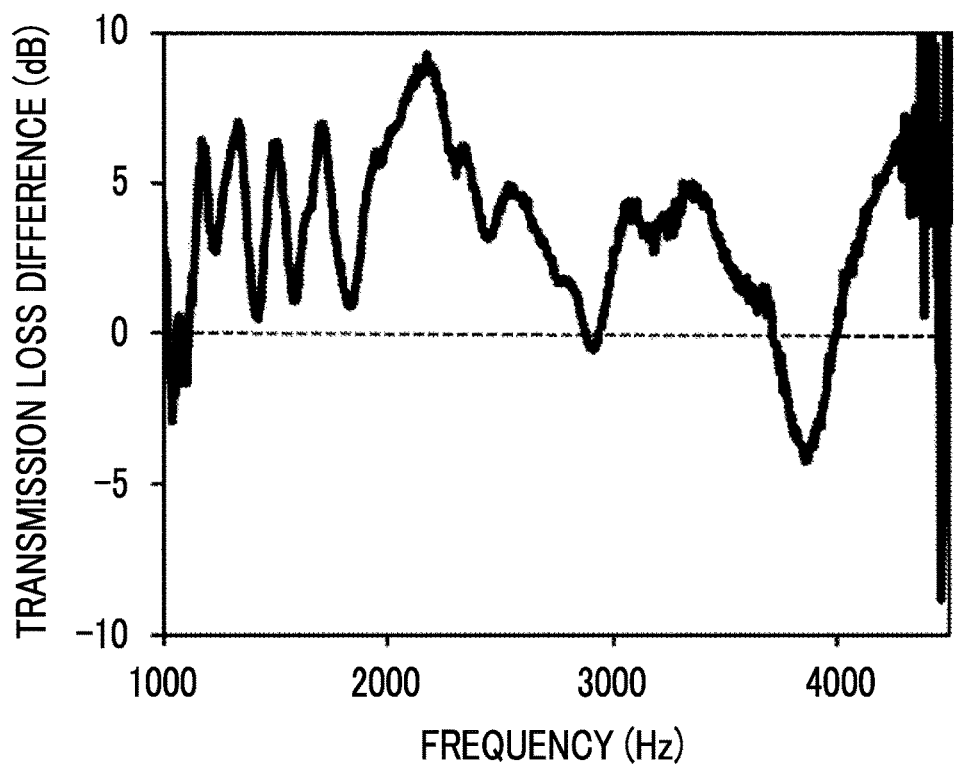
FIG. 21 is a diagram showing a difference in transmission loss obtained for each of the soundproof structure produced in Example 1 and a single acrylic plate.

The sound absorption coefficient obtained for the produced soundproof structure is shown in FIG. 20. In addition, the difference between the transmission losses respectively obtained for the produced soundproof structure and the single acrylic plate is shown in FIG. 21. FIG. 21 is a diagram showing how much the transmission loss is increased by fixing the membrane-like member and the rear surface plate to the support body.

As can be seen from FIG. 20, in the produced soundproof structure, the frequency of the fundamental vibration mode is present in the vicinity of 1.5 kHz, and the sound absorption peaks are present at the frequencies (3 kHz and 4 kHz) on the higher frequency side. That is, the produced soundproof structure is a structure that exhibits a large sound absorption effect in the higher-order vibration mode.

Furthermore, as can be seen by comparing FIGS. 20 and 21, at the resonance frequency of the higher-order vibration mode exhibiting a high sound absorption coefficient, the transmission loss of the soundproof structure produced by fixing the membrane-like member and the rear surface plate to the support body becomes smaller than the transmission loss of the single acrylic plate (in other words, the transmittance becomes higher). On the other hand, on the higher frequency side than the above resonance frequency, the transmission loss of the produced soundproof structure becomes larger than the transmission loss of the single acrylic plate. As described above, in a case where a sound is incident on the soundproof structure as a plane wave, a large insulation effect is obtained on the higher frequency side than the resonance frequency.

Example 2

<Production of Box for Radiated Sound Experiment>

In order to investigate a radiated sound of a sound source, which was radiated from the sound source, a radiated sound experiment in a box was examined. Therefore, a box was prepared by surrounding a square cubic space of 300 mm on a side with five acrylic plates (thickness 10 mm). One surface of this box was an opening surface, and had a square opening of 300 mm on a side. In addition, a porous sound absorbing body having a thickness of 10 mm (CALMFLEX manufactured by Inoac Corporation) was attached to the inner surface of each of the five acrylic plates surrounding the space. In addition, a speaker as a sound source was disposed inside the box so that the acoustic output surface (speaker surface) thereof faced the opening. In addition, a soundproof structure produced by the procedure described below was disposed at a position where the opening in the box was closed. Accordingly, an experiment system in which radiation of a sound spreading from the speaker was insulated by the soundproof structure disposed on the opening surface was set.

<Production of Soundproof Structure>

By the same procedure as in Example 1, a soundproof structure having a membrane type resonance structure was produced. Acrylic was used as the material of a frame. Regarding the frame, a structure having a thickness of 3 mm, a square opening of 20 mm on a side, and an edge width of 5 mm was a basic unit, and a structure in which a plurality of the basic structures were arranged to reach an overall size of 300 mm×300 mm was used as a frame structure (support body). Regarding a method of producing the frame structure, a square was cut out from an acrylic plate having a thickness of 3 mm using a laser cutter to produce the frame structure. Accordingly, the frame structure having a size of 300 mm×300 mm in which 20 mm squares were periodically arranged at a pitch of 25 mm could be obtained. A rear surface plate made of an acrylic plate having a thickness of 2 mm was attached to the frame structure with a double-sided tape. In addition, a PET film having a thickness of 50 μm was attached to the surface (one end surface) of the frame structure. Accordingly, a soundproof structure in which a plurality of the same vibrating membrane structures as in Example 1 were periodically arranged and attached to the rear surface plate was produced.

<Evaluation>

The produced soundproof structure was attached to the position where the opening of the above-mentioned box was closed, and the amount of sound pressure transmitted through the opening surface was measured. Specifically, the amount of sound pressure emitted from the opening was measured by disposing three microphones at a position 150 mm away from the opening surface on the outside of the opening surface, and obtaining the average value of the sound pressure energies in the microphones.

In addition, the amount of transmitted sound pressure was measured by the same procedure as above in a case where a single acrylic plate having a thickness of 2 mm and a diameter of 60 mm was disposed on the opening surface.

Figure 22:
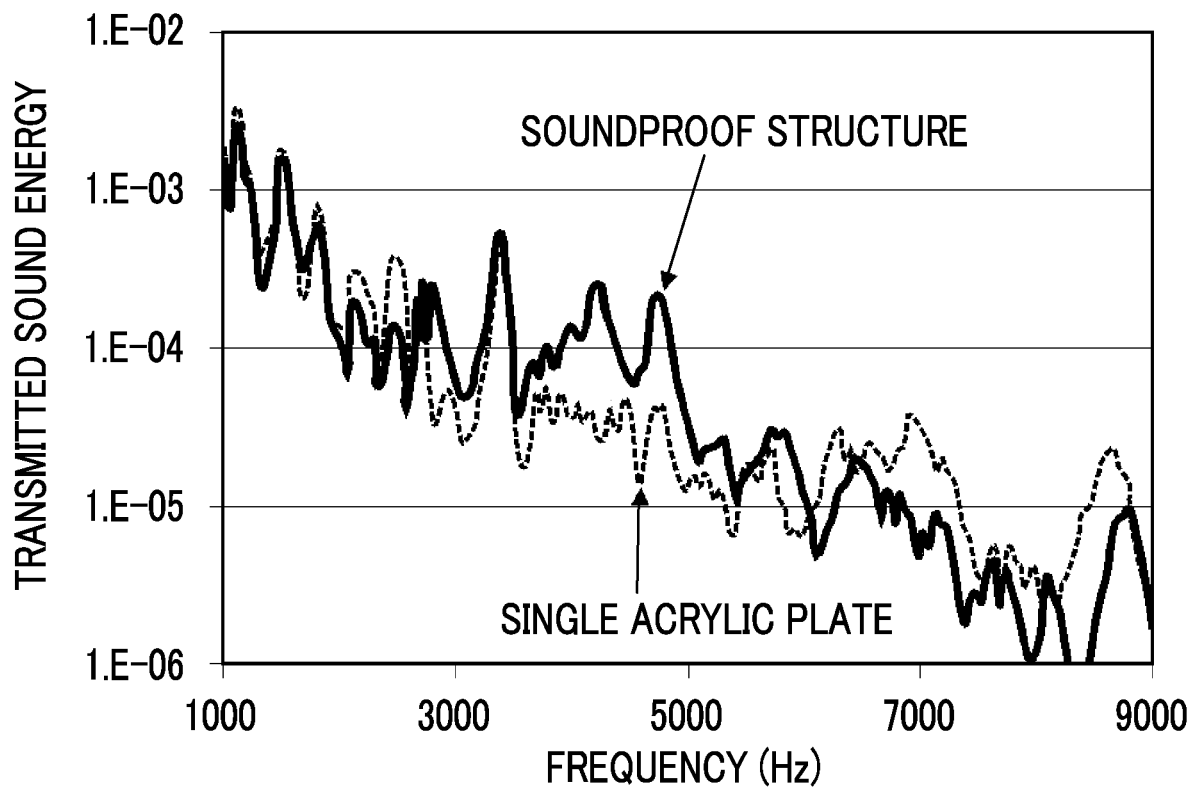
FIG. 22 is a diagram showing a measurement result of the amount of transmitted sound pressure in a case where a soundproof structure produced in Example 2 is used and in a case where a single acrylic plate is used.

The measurement results of the transmitted sound energies in a case of using the produced soundproof structure and in a case of using the single acrylic plate are shown in FIG. 22. In addition, the difference in transmission loss between the case where the produced soundproof structure was used and the case where the single acrylic plate was used is shown in FIG. 23.

Figure 23:
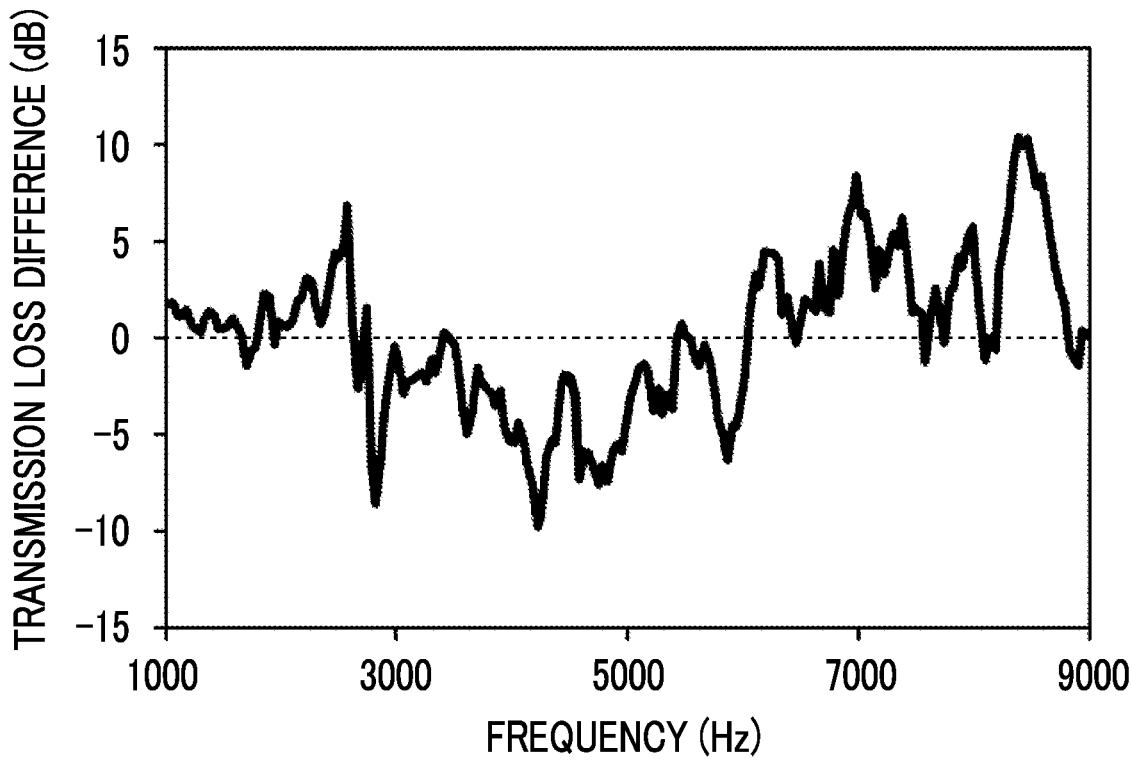
FIG. 23 is a diagram showing a difference in the amount of transmitted sound pressure between the case where the soundproof structure produced in Example 2 is used and the case where the single acrylic plate is used.

As is clear from FIGS. 22 and 23, while the amount of transmitted sound is higher in the vicinity of the resonance frequency in the case of using the produced soundproof structure than in the case of using the single acrylic plate, on the higher frequency side, the amount of transmitted sound is smaller in the case of using the produced soundproof structure than in the case of using the single acrylic plate (that is, the insulation is larger). It was found that even in the case of a radiation source having such a spread, as in the case of the plane wave incidence as in Example 1, a large insulation region is provided on the higher frequency side than the resonance frequency.

[Simulation 2]

A transmission loss in a case where the thickness of the rear surface space was changed from 1 mm to 6 mm in increments of 1 mm was simulated using the same model as the calculation model used in Simulation 1. Each setting value in the calculation model is the same as in the case of Simulation 1 except for the thickness of the rear surface space.

Figure 24:
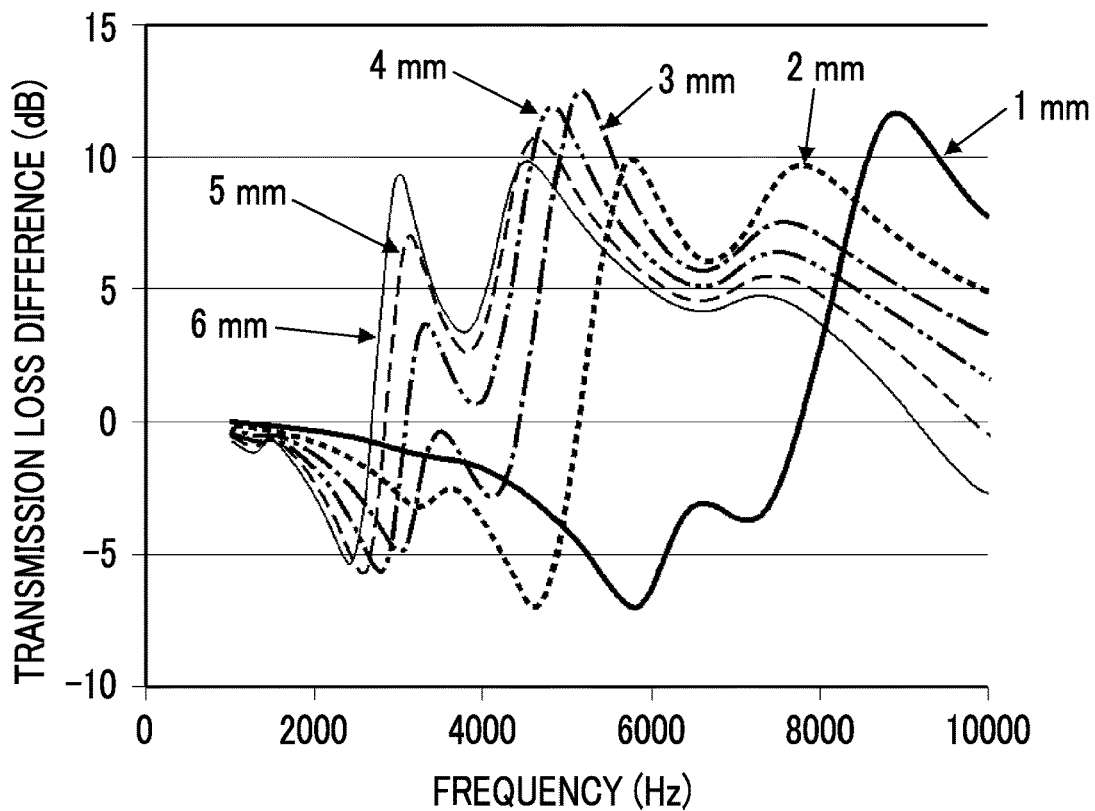
FIG. 24 is a diagram showing a calculation result in a case where a transmission loss is simulated by changing the thickness of a rear surface space from 1 mm to 6 mm in increments of 1 mm.

The transmission loss calculated for the thickness of each rear surface space is shown in FIG. 24. The vertical axis of FIG. 24 represents the difference between the transmission loss calculated for the thickness of each rear surface space and the transmission loss in a case where a structure in which only the membrane-like member was excluded from the resonance structure of the soundproof structure of the present invention (that is, a structure with only the rear surface plate and the support body) was used.

In a case where the thickness of the rear surface space is in the above range, as can be seen from FIG. 24, with any thickness, a region in which the transmission loss becomes a relative minimum in the vicinity of the resonance frequency, and the transmission loss becomes a peak (a relative maximum) on the higher frequency side is present. That is, the soundproof structure of the present invention having the resonance structure (membrane type resonance structure) exhibits its effect regardless of the thickness of the rear surface space.

[Simulation 3]

A transmission loss in a case where the thickness of the membrane-like member was changed from 10 μm to 100 μm in increments of 10 μm was simulated using the same model as the calculation model used in the simulation 1. Each setting value in the calculation model is the same as in the case of Simulation 1 except for the thickness of the membrane-like member.

Figure 25:
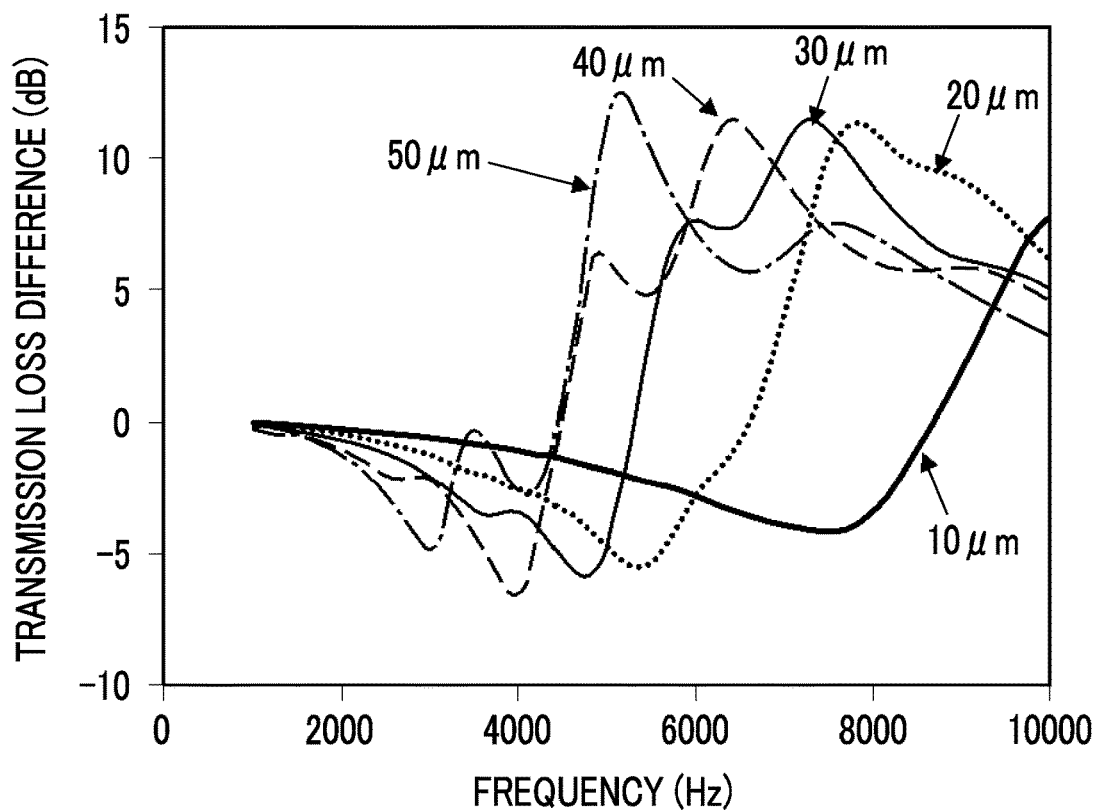
FIG. 25 is a diagram showing a calculation result in a case where the transmission loss is simulated by changing the thickness of the membrane-like member from 10 µm to 50 µm in increments of 10 µm.

The transmission loss calculated for the thickness of each membrane-like member is shown in FIGS. 25 and 26. The vertical axis of each of FIGS. 25 and 26 represents the difference between the transmission loss calculated for the thickness of each membrane-like member and the transmission loss in a case where the structure in which only the membrane-like member was excluded from the resonance structure of the soundproof structure of the present invention (that is, the structure with only the rear surface plate and the support body) was used.

In a case where the thickness of the membrane-like member is in the above range, as can be seen from FIGS. 25 and 26, with any thickness, a region in which the transmission loss becomes a relative minimum in the vicinity the resonance frequency, and the transmission loss becomes a peak (a relative maximum) on the higher frequency side is present. That is, the soundproof structure of the present invention having the resonance structure (membrane type resonance structure) exhibits its effect regardless of the thickness and hardness of the membrane-like member.

In each of Examples 1 and 2 of the present invention and Simulations 1 to 3 described above, the relative maximum resonance frequency fr is set to be lower than the sound insulation target frequency fn, and fn/fr is in the range of 1.05 to 1.50, so that both are within the ranges of the present invention. Therefore, the effect of the present invention is clear.

EXPLANATION OF REFERENCES

10: Partition member
20: Soundproof structure
22: Membrane type resonating body
24: Support body
24s: Opening surface
26: Frame
28: Opening
30: Membrane-like member
32: Membrane
34: Fixed portion
36: Vibratable part
38: Through-hole
40: Rear surface plate
42: Rear surface space
44: Plate body
50: Porous sound absorbing body

What is claimed is:

1. A partition member comprising:
    a soundproof structure that reduces noise emitted from a sound source on one side of two spaces,
    wherein the partition member partitions the two spaces,
    the soundproof structure includes
    a support body having an opening,
    a membrane-like member that is fixed to an opening surface of the support body in which the opening is formed and that vibrates in a case where noise is incident, and
    a rear surface plate fixed to the support body on a side opposite to the membrane-like member,
    the soundproof structure absorbs a sound by a resonance structure formed by a rear surface space surrounded by the rear surface plate, the membrane-like member, and the support body and the membrane-like member, and insulates a sound having a frequency higher the relative maximum resonance frequency at which a sound absorption coefficient becomes a relative maximum among resonance frequencies of the resonance structure,
    the relative maximum resonance frequency is set to be lower than a sound insulation target frequency set for noise, and in a case where the sound insulation target frequency is indicated as fn and the relative maximum resonance frequency is indicated as fr, fn/fr is 1.05 to 1.50.

2. The partition member according to claim 1,
wherein at least a part of each of the membrane-like member and the rear surface plate is fixed to the support body, and
the vibration of the membrane-like member propagates from a part of the support body to which the membrane-like member is fixed to a part of the support body to which the rear surface plate is fixed.

3. The partition member according to claim 1,
wherein the soundproof structure is formed by a plurality of membrane type resonators,
the membrane-like member includes a fixed portion fixed to the opening surface, and a vibratable part located inside the fixed portion,
each of the plurality of membrane type resonators absorbs a sound by the resonance structure in a case where the vibratable part of the membrane-like member vibrates,
in each of the plurality of membrane type resonators, a sound absorption coefficient at a resonance frequency of at least one higher-order vibration mode present at 1 kHz or higher of the vibration of the vibratable part of the membrane-like member is higher than a sound absorption coefficient at a resonance frequency of a fundamental vibration mode, and
the resonance frequency of the at least one higher-order vibration mode is set to be lower than the sound insulation target frequency.

4. The partition member according to claim 1,
wherein in a case where a Young's modulus of the membrane-like member is indicated as E (Pa), a thickness of the membrane-like member is indicated as t (m), a thickness of the rear surface space is indicated as d (m), and a diameter or equivalent circle diameter of the vibratable part of the membrane-like member is indicated as $\Phi$ (m), a hardness $E \times t^3$ (Pa·m$^3$) of the membrane-like member is $21.6 \times d^{-1.25} \times \Phi^{4.15}$ or less.

5. The partition member according to claim 4,
wherein the hardness $E \times t^3$ (Pa·m$^3$) of the membrane-like member is $2.49 \times 10^{-7}$ or more.

6. The partition member according to claim 1,
wherein the soundproof structure is formed by a plurality of membrane type resonators, and
at least two membrane type resonators among the plurality of membrane type resonators are different from each other in kind.

7. The partition member according to claim 6,
wherein the membrane-like member includes a fixed portion fixed to the opening surface, and a vibratable part located inside the fixed portion for each of the membrane type resonators,
the fixed portion and the vibratable part provided for each of the membrane type resonators are disposed in the same membrane-like member, and
a volume of the rear surface space is different between the at least two membrane type resonators that are different from each other in kind.

8. The partition member according to claim 1,
wherein the soundproof structure is formed by a plurality of membrane type resonators,
the membrane-like member includes a fixed portion fixed to the opening surface, and a vibratable part located inside the fixed portion,
each of the plurality of membrane type resonators absorbs a sound by the resonance structure in a case where the vibratable part of the membrane-like member vibrates, and
a through-hole is formed in the vibratable part of the membrane-like member in at least one of the plurality of membrane type resonators.

9. The partition member according to claim 1,
wherein the soundproof structure further has a porous sound absorbing body provided in the rear surface space or at a position in contact with the membrane-like member.

10. The partition member according to claim 1,
wherein the soundproof structure is disposed in a state where the membrane-like member faces the sound source side.

11. The partition member according to claim 2,
wherein the soundproof structure is formed by a plurality of membrane type resonators,
the membrane-like member includes a fixed portion fixed to the opening surface, and a vibratable part located inside the fixed portion,
each of the plurality of membrane type resonators absorbs a sound by the resonance structure in a case where the vibratable part of the membrane-like member vibrates,
in each of the plurality of membrane type resonators, a sound absorption coefficient at a resonance frequency of at least one higher-order vibration mode present at 1 kHz or higher of the vibration of the vibratable part of the membrane-like member is higher than a sound absorption coefficient at a resonance frequency of a fundamental vibration mode, and
the resonance frequency of the at least one higher-order vibration mode is set to be lower than the sound insulation target frequency.

12. The partition member according to claim 1,
wherein the soundproof structure is disposed on at least a part of a surface of the partition member.

13. The partition member according to claim 1,
wherein a thickness of the membrane-like member is 10 μm to 200 μm.

14. The partition member according to claim 1,
wherein a thickness of the rear surface space is 0.5 mm to 10 mm.

15. The partition member according to claim 1,
wherein fn/fr is 1.10 to 1.35.

16. A vehicle comprising:
the partition member according to claim 1,
wherein the partition member is disposed between a space in which at least one of a motor, an inverter, an engine, or a tire is disposed, and a space in which an occupant rides.

17. An electronic device comprising:
the sound source in a housing; and
the partition member according to claim 1,
wherein the partition member is disposed in at least a part of the housing or in the housing.

* * * * *